US008566256B2

(12) United States Patent
Hueter et al.

(10) Patent No.: US 8,566,256 B2
(45) Date of Patent: Oct. 22, 2013

(54) UNIVERSAL SYSTEM AND METHOD FOR REPRESENTING AND PREDICTING HUMAN BEHAVIOR

(75) Inventors: Geoffrey J. Hueter, San Diego, CA (US); Steven C. Quandt, Encinitas, CA (US); Noble H. Hueter, San Diego, CA (US)

(73) Assignee: Certona Corporation, San Diego, CA (US)

(*) Notice: Subject to any disclaimer, the term of this patent is extended or adjusted under 35 U.S.C. 154(b) by 933 days.

(21) Appl. No.: 12/415,758

(22) Filed: Mar. 31, 2009

(65) Prior Publication Data
US 2009/0248599 A1 Oct. 1, 2009

Related U.S. Application Data

(60) Provisional application No. 61/041,447, filed on Apr. 1, 2008.

(51) Int. Cl.
*G06E 1/00* (2006.01)
*G06E 3/00* (2006.01)
*G06F 15/18* (2006.01)
*G06G 7/00* (2006.01)

(52) U.S. Cl.
USPC .............................................. 706/12; 706/20

(58) Field of Classification Search
USPC .......................................................... 706/20
See application file for complete search history.

(56) References Cited

U.S. PATENT DOCUMENTS

| | | | | |
|---|---|---|---|---|
| 5,787,408 | A * | 7/1998 | Deangelis | 706/25 |
| 6,370,513 | B1 * | 4/2002 | Kolawa et al. | 705/7.33 |
| 2002/0082901 | A1 * | 6/2002 | Dunning et al. | 705/10 |
| 2002/0151992 | A1 * | 10/2002 | Hoffberg et al. | 700/83 |
| 2003/0176931 | A1 * | 9/2003 | Pednault et al. | 700/31 |
| 2004/0215793 | A1 * | 10/2004 | Ryan et al. | 709/229 |

* cited by examiner

*Primary Examiner* — Ben Rifkin
(74) *Attorney, Agent, or Firm* — Richard D. Clarke

(57) ABSTRACT

A system and method is disclosed for profiling subjects and objects based on subjects' responses to various objects for purposes of determining and presenting the objects most likely to generate the most positive response from each visitor. Object ratings, such as aesthetic response, preference, interest, or relevancy, are explicitly submitted by subjects or derived implicitly from visitor interactions with the objects. Objects include movies, books, songs, commercial products, news articles, advertisements or any other type of content or physical item. A profiling engine processes the ratings information and generates compact profiles of each subject and object based on the similarities and differences in affinities between the group of subjects and the group of objects. A recommendation engine then generates recommendations to a subject based on similarity between the subject and object profiles. The recommendation engine can also match subjects to other subjects and objects to other objects. The recommendation engine can also predict affinity across object catalogs and across time. Additionally, the object profiles can be clustered to create behavioral object categories. The system has application in personalization, behavioral targeting, Internet retailing and interactive radio, to name but a few applications.

29 Claims, 23 Drawing Sheets

UNIVERSAL SYSTEM AND METHOD FOR REPRESENTING AND PREDICTING HUMAN BEHAVIOR

FIELD OF THE INVENTION

The present invention relates to electronically marketing goods, services, content, and other entities through the automated analysis of human behavior. Particularly, the present invention relates to the representation of subject and object characteristics for purposes of efficient generation of recommendations; cross marketing between product, service, and content categories; and self-categorization of products by aesthetic similarity. The system has application in personalization, behavioral targeting, Internet retailing and interactive radio, to name but a few applications.

BACKGROUND OF THE INVENTION

The consumer faces a profound number of possible choices when selecting most kinds of products, be it movies, music, books, travel, art, dining, employers, and so on, to the extent that the consumer must choose from well-publicized possibilities, such as through advertising, or rely on recommendations of others. In the first case the set of choices is severely limited to those that can be promoted to a broad audience. In the second case the consumer must weigh the similarity of his or her own tastes to the person making the recommendation, whether it be an acquaintance or media. In addition, the number of possibilities and the cost of acquisition, both in terms of time and money, of assessing possibilities, make it infeasible to sample a large number of possibilities to determine which are of interest to the consumer.

Recommendation systems rely on trying to best match a person's individual preferences to the characteristics of the available items. In general what is known about the subjects and objects is the set of affinities between subjects and objects, where the affinity $\{A_{ij}\}$ between subject i and object j is determined by explicit feedback from the subject or inferred from the subject's interaction (or non-interaction) with the object. The consistency of the affinity scale from subject to subject and object to object derives from the consistency of the goal of the subjects in the given environment, for example to make a purchase in a commerce environment or to read articles in a content environment.

The primary goal of the recommendation system is to predict for a given subject those objects for which the subject will have the greatest affinity. In general the subject characteristics can be represented by a vector $S=(S_1, S_2, \ldots, S_L)$ and the object characteristics can be represented by a vector $B=(B_1, B_2, \ldots, B_M)$, whereby the predicted affinity of the subject to the object is a function $P=f(S, B)$. Various recommendation systems then differ in their representation of subject and object characteristics S and B and the similarity function f.

One method that has been used, commonly referred to as collaborative filtering, is to represent the subject as the set of object ratings that the subject has provided; i.e., $S=\{R_1, R_2, \ldots, R_L\}$, where $R_i$ is the subject's rating of object i. In most scenarios where recommendations are of use, the number of available items (e.g., such as catalog size) is going to be much larger than the number of items that have been rated by the subject, and so the set S is sparse. To generate a recommendation of a particular object to a particular subject, the subject's profile is compared to the profiles of other subjects that have rated the object. Given the similarities and dissimilarities of objects that have been rated in common, an estimate of the subject's response is generated. In a recommendation system, the system would generate estimates for a variety of objects rated by similar people and return as recommendations the objects with the highest predicted ratings.

Effectively, this type of system is a "mentored" system, whereby each subject is matched to a set of other subjects with similar tastes that have rated objects that the subject has not rated. This approach has several drawbacks, which include: recommendations can only be made where the subject's small set of mentors have provided coverage; the method is dependent on a class of users that have provided a large number of ratings (i.e., mentors), or else the system database must be searched to provide mentors appropriate to each requested object; the method is limited in capacity to make recommendations across various categories (cross marketing); the method does not make full use of all data for each subject (that is, the method is restricted to the subset of mentors); the representation of the subject, which is the set of ratings for each rated object, is not compact and increases linearly with the number of rated objects; subject representations are not portable to other recommendation systems; requires lengthy questionnaires to introduce a new subject into the system; and faces combinatorial challenges to find the best mentor for a given user and is therefore not scalable to large user populations.

Additional desired characteristics of a recommendation system that cannot be addressed by the mentor method include inverse modeling of subject representations back to physical attributes, such as demographics or psychographics, and identification and representation of object similarities.

Another approach is shopping basket analysis, which makes suggestions based on objects that have been purchased by other subjects at the same time as an object that has been selected by the targeted subject. However, this approach relies on transactional dependency and does not allow prediction of preference for objects that are not purchased together. In particular this method cannot associate subject/object affinities across catalog or across time as catalog items are replaced by similar items. Shopping basket analysis is also not specific to individual subjects, but rather to aggregate transaction histories across all subjects. By contrast, the present invention automatically normalizes all product profiles across product categories and can combine information across single vendor transaction histories.

Other approaches classify objects according to expert defined categories or attributes, whereby each object is rated by each attribute and then recommendations are made by matching the expressed interests of the subject to the attributes of the objects. Expert systems have the drawback that they are not self-adapting; that is, they require expert classification or coding. This means that such systems are specific to a single product domain. Also, because they are not data driven, they are not able to process large, diverse, and constantly changing transaction histories.

Predictive modeling techniques use demographics to model subjects. Not only are demographics an indirect substitute for aesthetic opinions and therefore inherently inaccurate, this is invasive of the subject's privacy and only specific to groups of subjects and not to individual subjects.

SUMMARY OF THE INVENTION

In accordance with the present invention, a method and system is presented for collecting subjects' affinities to objects, extracting subject and object profiles, and generating recommendations to subjects of objects that were rated by other subjects. This invention is sometimes referred to in this patent by its commercial trademarked name, Resonance®.

An object of the invention is to provide a means of recommending objects to subjects based on either explicit or behaviorally inferred ratings of other subjects of those objects and of commonly rated objects.

Another object of the invention is to compactly and uniformly represent subject and object profiles so that the affinity, or preference, of the subject to the object can be quickly and efficiently predicted, and so that the number of features in the profiles of the subjects and objects is not directly dependent on the number of subjects or objects in the system.

Another object of the invention is to create a representation of objects that is universal across all types of objects, so that all types of objects can be compared to one another and the subject's interaction with one set of objects can be extrapolated to other types of objects, and that the representation is derived solely from the collective interaction of subjects with the set of objects (catalog) and does not require detailed object information or expert knowledge of object characteristics.

Another object of the invention is to enable the use of all subject-object interactions, and not just, for example, purchase behavior, to form profiles of subject and objects for faster profiling and greater accuracy and responsiveness to temporal changes in site merchandising or customer behavior.

Another object of the invention is to create object profiles as well as subject profiles, so that objects can be readily indexed by aesthetic or other categories and so that objects can be readily associated across product categories by aesthetic similarity.

Another object of the invention is to create subject and object profiles that can be used to relate the derived aesthetic attributes to other objective measures of subjects, such as personality type or demographics, and objects, such as color or shape.

Another object of the invention is to collect ratings information from multiple applications while protecting the anonymity of the subject across different applications and minimizing the need to normalize object information (metadata) across catalogs.

Another object of the invention is to combine the recommendations of the system with explicit human merchandising objectives either through "hard" rules that filter results by specified criteria or "soft" rules that bias the results towards a defined business goal.

Another object of the invention is to provide recommendations to groups of subjects based on the best match to their collective profiles.

Another object of the invention is to enhance product and content marketing by characterizing the attributes of object profiles.

Another object of the invention is to identify appropriate subjects for the marketing of a particular object.

The present invention is a system and method for predicting subject responses to objects based on other subjects' responses to that and other objects. The process of matching subject and object profiles produces a predicted response score that can be used to rank recommended content. The scores can be used as is or combined with other business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that retailers "push" potentially unwanted products through advertising or other inefficient means.

The invention also addresses the issue of consumer privacy because it does not profile the consumer using personal demographics information, which consumers find both invasive and tedious to enter. Thus Resonance improves retailers' ability to target customers, while simultaneously making it easier for consumers to participate.

The invention works by forming profiles of subjects, for example consumers, and objects, such as goods or media, based on aesthetic evaluations of objects by subjects. The invention does not require a priori information about either subjects, such as demographics or psychographics, or objects, such as classifications or genres. Rather, it automatically generates representations of subjects and objects solely from the subjects' interaction with the objects. Because it creates its own abstract representation of subjects, it allows retailers to transparently target the subject without compromising subject privacy through the collection and modeling of sensitive personal information. The profiles can also be extended across catalogs, product or content domains, or across websites or stores.

Note that the identification of subjects and objects is not a physical one and may change depending on the application. For example, in a consumer movie recommendation application, the person requesting recommendations is the subject and the movie is the object. In a dating service application, a person would be considered a subject when searching for matches and an object when being searched by others. Similarly, in the case of employer/employee matching, companies and persons would alternate between the roles of subject and object. Note that in cases where an entity can assume different roles, a different profile would be created for each role.

Because the profiles are symmetric (both subjects and objects are profiled to the same representation), subjects can be matched to other subjects or objects, and objects can be matched to other objects or subjects. For example subject-subject matching could be used on a social networking site to connect people of like interests or on an online store to order product reviews according to the similarity of the reviewer to the reader. Similarly, object-object matching can be used to match keywords to products or content, advertisements to news articles, or promotional banners to referring affiliate sites.

Subjects and objects are represented as a set of derived abstract attributes, or feature vectors. In addition to driving the matching process, the distributions of the dimensions can be used to predict which items will evoke strong reactions (negative and positive) from a typical group of subjects and which items will evoke a more even response across those subjects.

The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over collaborative filters is that it creates not just profiles of the subjects, but profiles of the objects as well. This provides several advantages, including rapid and scalable prediction of subject to object affinities; straightforward cross marketing across product categories; and sorting of objects by aesthetic categories for purposes of browsing and selecting items for consumption or association, such as selecting musical recordings to go with a movie production.

DETAILED DESCRIPTION OF THE DRAWINGS

Figure 1:
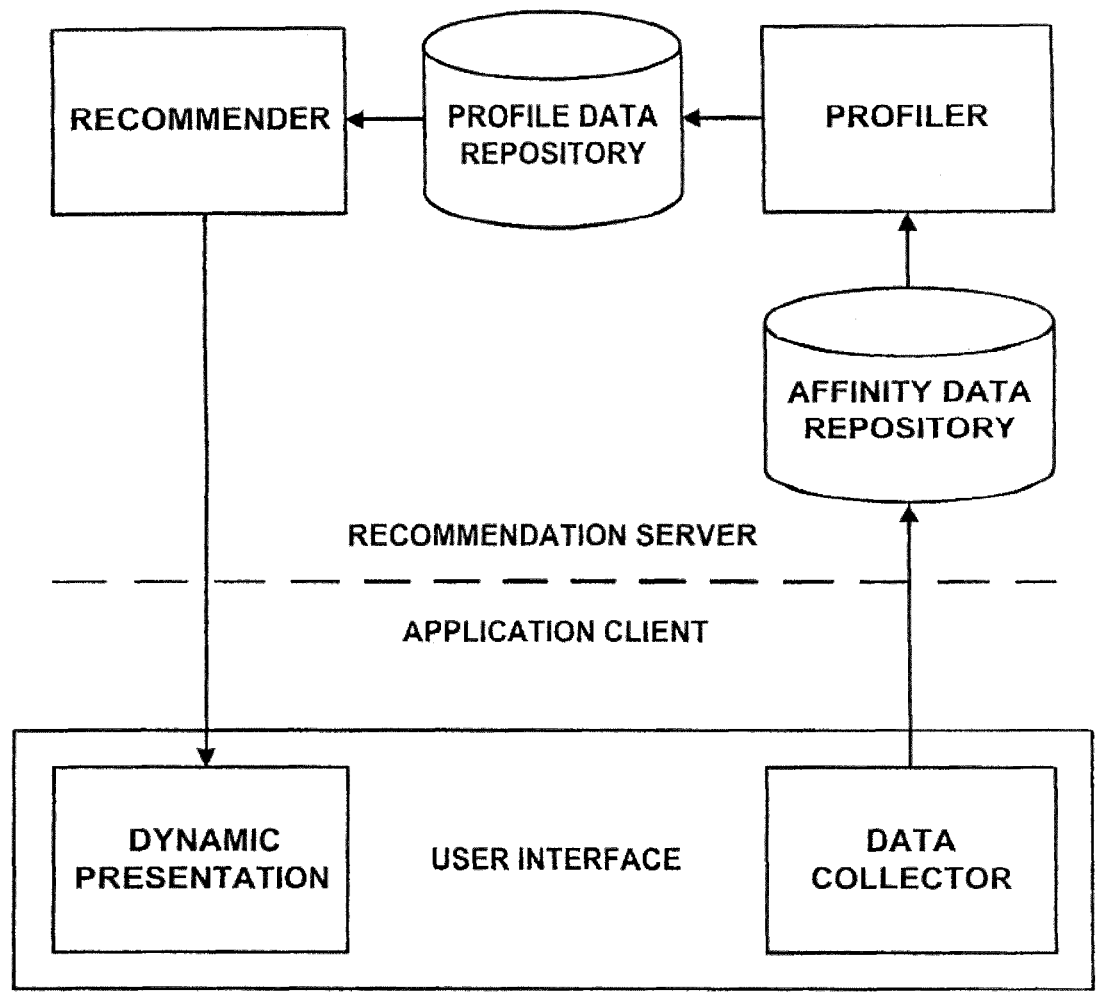
FIG. 1 shows the principal components of the system.

FIG. 1 shows the principal components of the system. As shown in the figure, there is an application client, such as a web browser, kiosk, or mobile phone, and a recommendation server, which is typically a centralized computer within a network or across the Internet. A subject interacts with a user interface. The subject indicates level of interest or affinity towards one or more objects either directly by rating objects of interest or indirectly by interacting with specific objects in the context of the application. These affinities are fed through a data collector to a data repository, which stores all of the affinities from the various clients. The affinities are used as the input to a profiler, which converts the subject-object affinity sequences into reduced, vectorized profiles of both subjects and objects. The resultant subject and object profiles are stored into a profile data repository. Finally, the recommender matches the subject profile to the object profiles and renders the recommendations through a dynamic presentation back to the user interface. As an alternative embodiment the recommendation request can be made through an intermediate server, which then renders the recommendations to the user interface. The profiling and recommendation process operates continuously, so that more accurate recommendations can be made to the subject as more affinities are collected from the subject. Because each subject and object has its own unique set of affinities, each subject and each object will have its own unique profile.

The end-user interface can be implemented using a variety of devices, including a personal computer, an in-store kiosk, a personal digital assistant (PDA), a mobile phone, a set top box, or an ordinary phone with voice capability.

Figure 2:
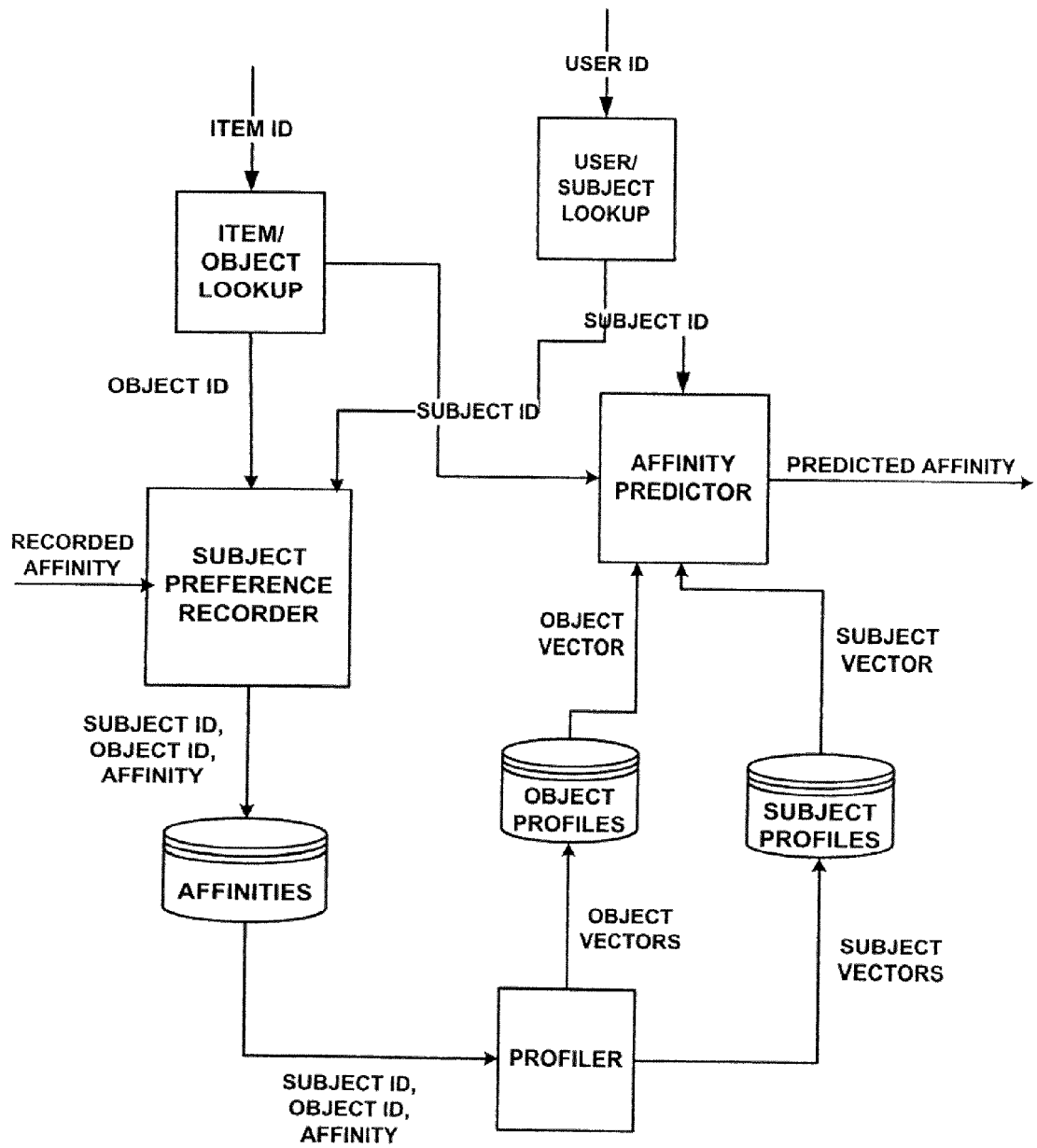
FIG. 2 shows the internal components of the recommendation server.

FIG. 2 shows the internal components of the recommendation server. The profiling engine, or profiler, pulls ratings and profile information out of the affinity database, calculates subject and object profiles, and stores the resultant profiles in their respective profile databases. The representations are multi-dimensional vectors, whereby each dimension represents an abstract attribute of the subject/object interaction. To make recommendations, the recommendation server, or affinity predictor, retrieves the subject and object profiles from the profile database. The subject and object profiles are used to determine a rank-ordered list of recommendations to be returned to the application client, according to the requested criteria of the application client.

The recommendation server stores the received ratings in an affinities database. Each entry of the affinities database consists of three values (subject_id, object_id, affinity), where the subject_id is a unique identifier of the person or other agent that generated the affinity, the object_id is a unique identifier of the entity that is being rated, and the affinity is a value indicating the affinity of the subject to the object. The rating can be any integer or continuous value that allows objects to be ranked by preference. Affinities can be entered explicitly or implicitly. Explicit affinities are those that result from a specific response of the subject, such as when the subject rates objects according to a predetermined rating scale. This can be as simple as a "Yes/No", "Good/Bad", or "Satisfied/Dissatisfied", or a more graduated scale, such as "1 to 10" or "Love, Like, OK, Dislike, Hate". Implicit affinities are those that are derived from the behavior of the user, such as online browsing or other interactions with the application's catalog of items. Affinities can also be inferred from the subject's interaction with an object for both recurring and non-recurring transactions. For example, in applications where the purchase or experience of the object is normally repeated by the subject, such as the purchase of consumer products, for example soap, ice cream, cereal, or wine, the subject's affinity can be inferred from the frequency of purchase by the subject; i.e., a single purchase would imply dissatisfaction, whereas frequent purchase, relative to the typical rate of consumption for that product across the entire subject population, would imply high satisfaction. As in the case of non-recurring transactions, the absence of an affinity would not be interpreted as an indication of subject preference either way. Similarly, for television shows, watching nearly every episode of a series would indicate high satisfaction, whereas occasional watching, particularly incomplete viewing, would indicate low satisfaction. For music playback, such as a radio, individual songs would be rated according to the amount of time that the subject listened to the song relative to the total opportunity that the subject had to listen.

The end-user interface verifies the identity of the subject based on some type of user ID generated by the application, such as a user name and password, biometric, browser cookie, mobile phone ID or other identification. In order to allow a subject to be known to the recommendation system through different applications, the system provides a user/subject lookup table that can map the user's different application identities to the common subject ID. Similarly, the application may present multiple variations of the same product, for example a hardbound vs. paperback version of the same book, or multiple sizes of the same shirt, which are mapped to the common object through the item/object lookup table.

Figure 3:
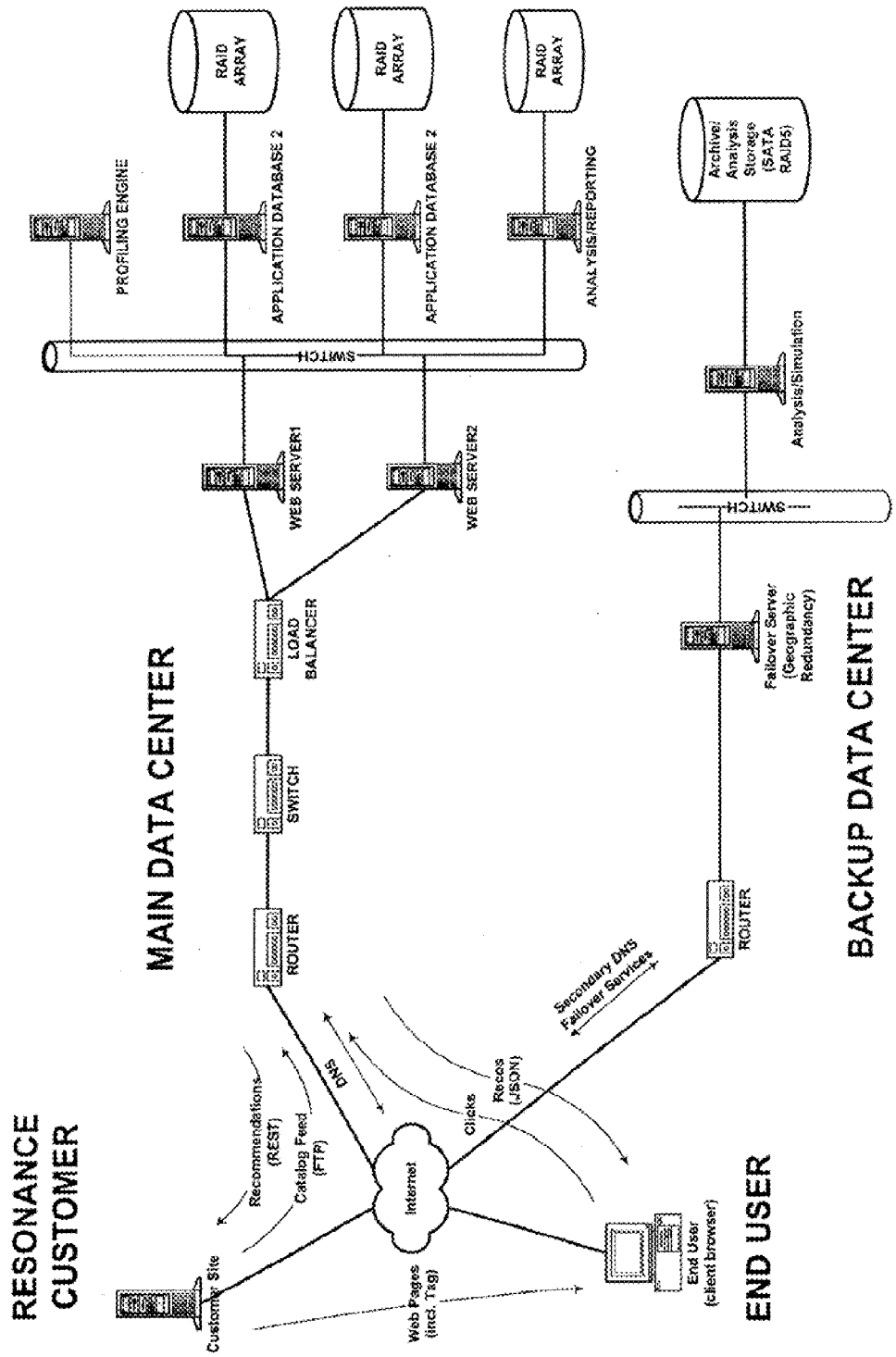
FIG. 3 shows the distribution of components across multiple computers on a network.

FIG. 3 shows an embodiment of the delivery of the system over the Internet. The end use application (Resonance customer) is a website that is external to the system and that communicates with the system via web services from the customer website or directly from the customer website's end user's client browser. As shown, the system may be distributed across multiple computers on a network. This consists of one or more web servers (or web farm), which collect data and process content recommendation requests. The web servers pass data to one or more application databases via a message queuing system that allows the web servers to continue processing while the much slower database servers feed the data into permanent storage, such as a direct attached RAID array, network attached storage (NAS), or storage area network (SAN). Additionally, a profiling engine retrieves affinity and other data from an application database and uses the data to generate the subject and object profiles, which are then stored back into the application database. The object vectors, active subjects' subject vectors, and any additional business rules logic are also cached on the web servers for faster match generation during live operation. In order to process an arbitrarily large number of visitors the web servers are multiplexed using a load balancer, which makes a collection of web servers appear to the Internet as a single server. Also, when a web server becomes unavailable or out of service for any reason, the load balancer automatically transfers traffic to another server. This provides a high level of fault tolerance for the system. In order to provide additional service availability the database and web servers can be mirrored to a backup data center, whereby the backup datacenter goes into service when the main datacenter goes out of service. While waiting in backup mode, the backup datacenter can be used to analyze and simulate service improvements prior to releasing the changes to live traffic. Note that in this embodiment the service has been distributed over multiple servers. In an alternative embodiment all of the functions of the service could be put onto a single or smaller set of servers without a substantive change in the overall functionality of the service.

Figure 4:
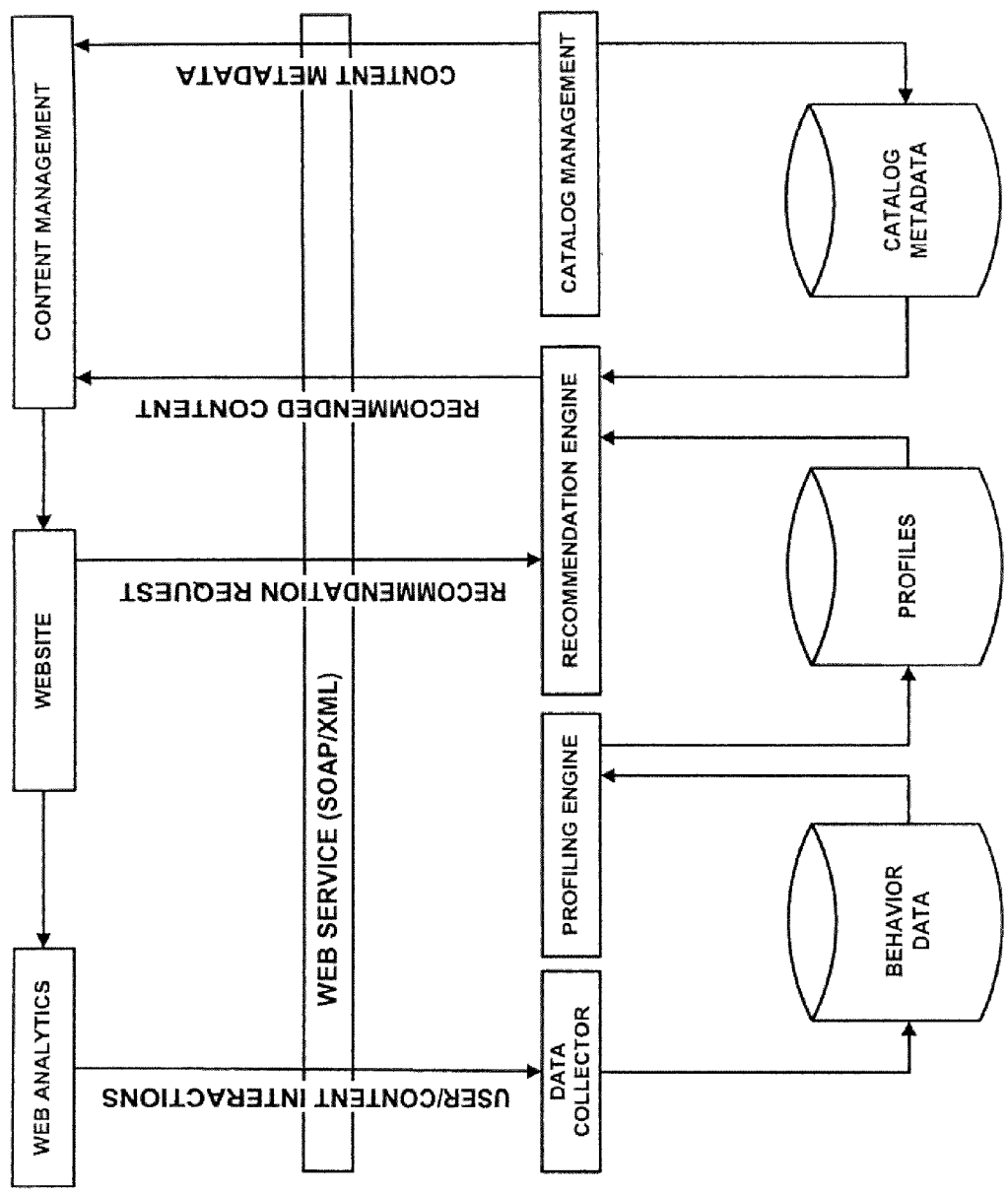
FIG. 4 shows an embodiment of the system using web services on a distributed network.

FIG. 4 shows an embodiment of the system using web services on a distributed network. The website, content management, and web analytics modules are external to the system and communicate with the data collector, profiling engine, recommendation engine and catalog management modules via web services (REST or SOAP), such as using XML. The website requests information from the content management module and displays it on the browser. The browser generates user behavior data via the web analytics module. This can be done on the browser itself using JavaScript or on the web server using web logging or packet sniffing. Regardless of how this is done, the web analytics submits data via a web service call to the data collector. To display customized content the website requests information from the recommendation engine, which is fed through the content management module to get the display attributes of the recommended content and then displayed on the website. The content management module not only generates content for the website, it also feeds content information (metadata) to the catalog management module, which stores both information necessary to display content and descriptive attributes that may be applied to filter targeted content according to website-defined business rules or objectives.

The data collector converts the raw behavior data, such as clickstreams, into affinities, which are then processed into user (subject) and content (object) profiles. When a request is made to the recommendation engine for targeted content, the recommendation engine combines the subject and object profiles with the catalog metadata to find the optimal content subject to any business rules, or other restrictions, put on the results.

Figure 5:
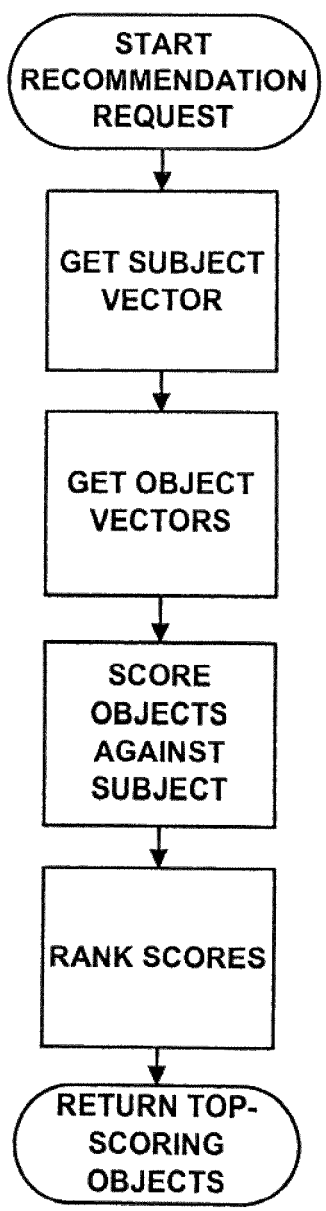
FIG. 5 shows the operation of the system to generate recommendations for a single user.

The details of the processing to generate recommendations for a single user are shown in FIG. 5. The recommendation engine compares the subject profile vector, S, to every object vector, B, in the category set requested in the recommendation request. In the preferred embodiment the match score between subject i and object j is calculated using the dot product $P_{ij}=S_i \cdot B_j$. The resulting set of scores is ranked from highest to lowest value, and the top values are returned to the application as the recommended objects for the user. Alternative match scoring methods include using Euclidean distance instead of the dot product, whereby the objects are ranked by closest distance first. Other alternative embodiments include requesting the match scores in other orders, such as lowest values first (e.g., "Bottom Ten") or alphabetic above a minimum score threshold, according to the needs of the application.

Further description of the subject and object representation for profiling subjects and objects and generating recommendations follows.

A subject is represented by a subject affinity vector $S=(S_1, S_2, \ldots, S_N)$, where N is the number of dimensions of the vector.

An object is represented by an object affinity vector $B=(B_1, B_2, \ldots, B_N)$, where N is the number of dimensions of the vector.

The number of dimensions of the subject and object vectors must be the same. The number of dimensions needed to represent a particular set of subjects and objects is not known a priori and is derived automatically by the system according to a method to be described further below.

The affinity, A, of a subject to an object is a single numeric value. This value is captured via feedback from the user, either directly from a user rating or indirectly through user interaction with the object environment. As presented to the subject in the application user interface, typical affinity ranges are 1 to 10, 1 to 5 stars, or like/dislike. Internally, the affinities are scaled between 0 and 1, with 0 being least affinity and 1 being highest affinity. In an alternative implementation affinities can be scaled from −1 to +1. Note that an affinity can also be given a weight, w, which is used to determine how much consideration to give that affinity in deriving the associated subject and object profiles.

The predicted affinity, P, of a subject to an object is modeled by the dot product between their vectors:

$$P = S \cdot B = \sum_{i=1}^{N} S_i \times B_i.$$

In the preferred embodiment the system predicts affinities by calculating them "on-the-fly" when requested by the recommendation application server. It is also possible to calculate the affinities as the vectors are updated; however, this results in considerable additional storage as well as significant database traffic to continually resave predicted affinities when vectors are updated. The dynamic method is typically faster because it minimizes database traffic and supports parallel distributed processing, which allows the system to be scaled to a large number of subjects and objects.

Figure 6:
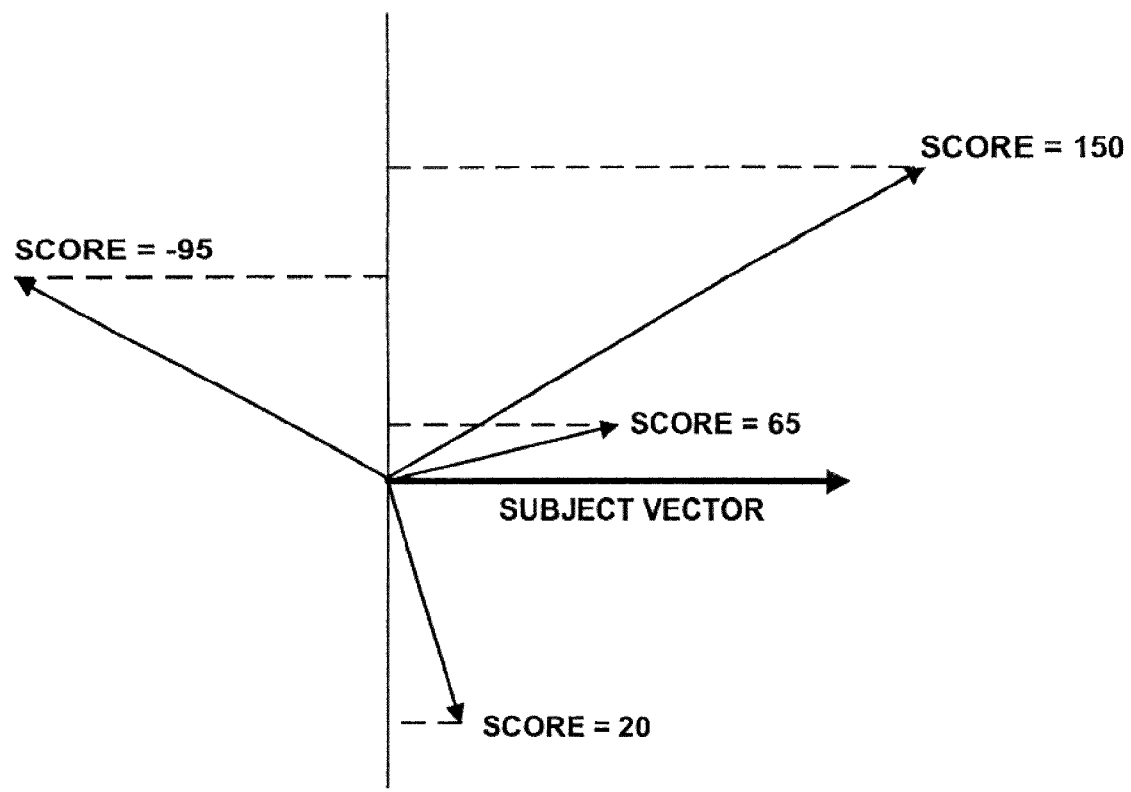
FIG. 6 illustrates the profile matching process.

FIG. 6 illustrates the vector matching process. Note that in effect the matching is determined by a projection of the object vector onto the subject vector, so that it is not just the magnitude of the object vector, which corresponds to the general popularity of the object, that determines whether an object is recommended, but whether the attributes of the object are aligned with the subject's interests. Scores can be both positive and negative, but generally only the content with the highest-ranking positive scores are returned as recommendations.

Figure 7:
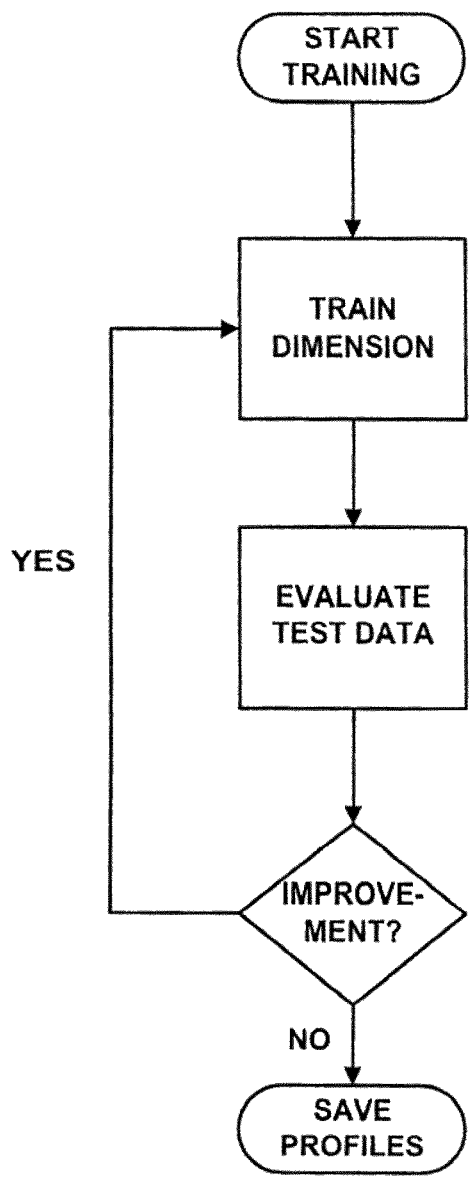
FIG. 7 shows the generation, or training, of the subject and object profile vectors.

FIG. 7 shows the generation, or training, of the subject and object profile vectors. Training the vectors consists of adjusting the positions of a set of subject vectors, {S}, and a set of object vectors, {B}, to minimize the cost, or error, function $$f_{AE} \equiv \left[ \frac{1}{G} \sum_{i=1}^{Nsubjects} \sum_{j=1}^{Nobjects} (A_{ij} - w_{ij} S_i \cdot B_j)^2 \right]^{1/2},$$

where $A_{ij}$ is the affinity of the subject to the object, $w_{ij}$ is the weight of the measurement, and $$G = N_{subjects} \times N_{objects} \times N.$$

As shown in the figure, determination of the optimal number of dimensions, N, for the subject and object vectors is an iterative process. At each iteration the subject and object vectors are calculated using the method described below. Part of the data, called the test set, is not included in the modeling, or training, process. The test set provides an independent measurement of the predictive capability of the number of dimensions for that iteration. If the test set error is reduced for that iteration relative to the previous iteration, then the next number of dimensions (N→N+1) is trained and the testing process is repeated. Regardless of the change in the training set error, which will almost always decline with an increased number of model parameters, or vector dimensions, if the test error for the iteration is higher than the previous, then the training process is terminated, and the subject and object vectors for the previous, best iteration are saved for active, or live, system use. Note that at a given iteration, all subjects are eliminated that have rated fewer than N objects, and all objects are eliminated that have fewer than N ratings, where N is the number of vector dimensions at that iteration.

In practice $A_{ij}$ will only exist for certain subjects and objects and will likely be sparse. That is, it is not necessary for every subject to rate every object, but it is necessary that each subject rate at least as many objects as needed to meet the above training requirement for a specified number of profile dimensions. Further, the subject and/or object sets might be restricted for other specific retraining purposes, such as following the insertion or modification of an affinity. In this case we define $A(\{S\}, \{B\})$ as the set of affinities for which subject i is a member of {S} and object j is a member of {B}. Affinity weights range from 0 to 1. The weight, w, is determined by the circumstances by which the affinity is measured. If the affinity comes from an explicit rating by the subject, then the measurement is fully weighted (w=1), whereas, if the affinity was inferred by the subject not selecting a specific option from a list of options, then the measurement is lower weighted. Weighting assignments for different actions vary depending upon the application.

There are several methods for calculating the subject and object vectors. In one method the subject vectors are updated incrementally from step t to step t+1 via gradient descent:

$$S_i(t+1) = S_i(t) - \alpha \frac{\partial f_{AE}}{\partial S_i(t)}$$

for each subject i. The gradient is an analytical function of the subject vector, so that the update equation reduces to $$S_i(t+1) = S_i(t) + \frac{1}{G} \sum_{i=1}^{Nsubjects} \sum_{j=1}^{Nobjects} B_j(t)(A_{ij} - w_{ij} S_i(t) \cdot B_j(t)).$$

Similarly, the object vectors are updated according to $$B_j(t+1) = B_j(t) - \alpha \frac{\partial f_{AE}}{\partial B_j(t)}$$

for each object j, which reduces to $$B_j(t+1) = B_j(t) + \frac{1}{G} \sum_{i=1}^{Nsubjects} \sum_{j=1}^{Nobjects} S_i(t)(A_{ij} - w_{ij}S_i(t) \cdot B_j(t)).$$

At the update step t, all subject and object vectors are updated according to the above equations. The cost function is then re-evaluated with the t+1 vectors to determine whether it has reached the minimum within suitable criteria. In one embodiment the criteria are as follows:

If the update step decreases the cost function, then the learning rate, $\alpha$, is increased by 10 percent up to a maximum of $\alpha=2$. If the update step overshoots the minimum so that the cost function actually increases, then the learning rate is decreased by 50 percent (a factor of two) and the update step is repeated. The update process is considered completed when the cost function is less than 10 to the power of −6 or when the learning rate is less than 10 to the power of −12. The learning process is aborted if the cost function increases to greater than 100. The actual numerical values used in these processes are configurable and are adjusted to make the learning process as efficient as possible without introducing numerical instability.

If the termination criteria are met, then the update process is stopped. If the termination criteria are not met, then the update process is repeated until the acceptance criteria are met. Once the training is completed, the subject and object vectors are saved their respective profile databases.

In general the affinities will be used directly in the above profiling process; however, there are some circumstances where there may be variability in ratings or other information provided by subjects, including variations in time browsing pages on a website. In these cases performance of the system can be improved by normalizing the affinities for each individual. There are different possible normalization schemes, but the most commonly used is so-called Z scaling, whereby the affinity value is replaced by the mean-subtracted value divided by the variance of the subject's affinities:

$$Z=(A-\text{average}(A_i))/\text{variance}(A_i)$$

In the preferred embodiment the affinities range from 0 to 1 and the profile vectors (subjects and objects) are unconstrained. In this case it is possible for the predicted affinity to exceed the maximum affinity value of 1; however, the predicted affinities can still be scaled and ranked. Alternatively, it is also possible to limit the magnitude of the vectors either so that no attribute dimension can contribute more than a certain amount or to limit statistical noise. For example, when applying this "box" constraint, any dimension that exceeds 1 would be reduced to 1. Alternatively, the entire vector may be scaled to a fixed length (e.g., unit length) to emphasize the discovery of object or subject similarities without regard to popularity or intensity of the items.

There are several subject and object vector update modes, described below, which define different sets of subject and object vectors onto which to apply the above training method.

The most general case and the one that is applied to initialize the profiles is a complete re-training of all subject and object affinity vectors. This is done when adding a large volume of external data, changing/testing the number of vector dimensions, or as a quality assurance process to compare the incremental training with the (presumed optimal) complete training process.

The training process is as follows:
Get all subjects and objects for which there are affinities. Create Subject and Object lookup tables.
Get all affinities. Use lookup tables for database ID←→array index conversions.
Generate subject vectors, {S}, and object vectors, {B}, of the specified number of dimensions. Training minimizes the error function $f_{AE}(\{S\}, \{B\})$.
Save subject vectors to the Subject Profiles database and the object vectors to the Object Profiles database.

Upon completion of the training, the subject and object vectors are updated in their respective databases. Note that the above method bootstraps the subject and object vectors simultaneously, without requiring that the subject vectors be known in order to profile objects and vice versa. Once the bootstrapping process is completed, subsequent updates can be done on a single vector basis against the existing trained conjugate (subject or object) vectors. For example, a background process would run continuously to re-train an operational affinity database. Unlike the non-incremental general affinity update, this method only changes one subject or object vector at a time. Since this process is less complete than the general training method described above, the error function, or match of predicted and actual affinities, is periodically monitored and if it rises above an acceptability threshold, the system performs a complete bootstrap training.

The training process is as follows:
Get all subjects, {S}, and objects, {B}, for which there are affinities. Create Subject and Object lookup tables.
Get all affinities. Use lookup tables for database ID-array index conversions.
For each subject $S_i$ in {S}, generate a new subject vector using the single subject update (described below). Save the updated subject vector in the Subject Profiles database. Continue until all subjects have been processed.
For each object $B_j$ in {B}, generate a new object vector using the single object update (described below). Save the updated object vector in the Object Profiles database. Continue until all objects have been processed.
Repeat the previous two steps continuously.

Figure 8:
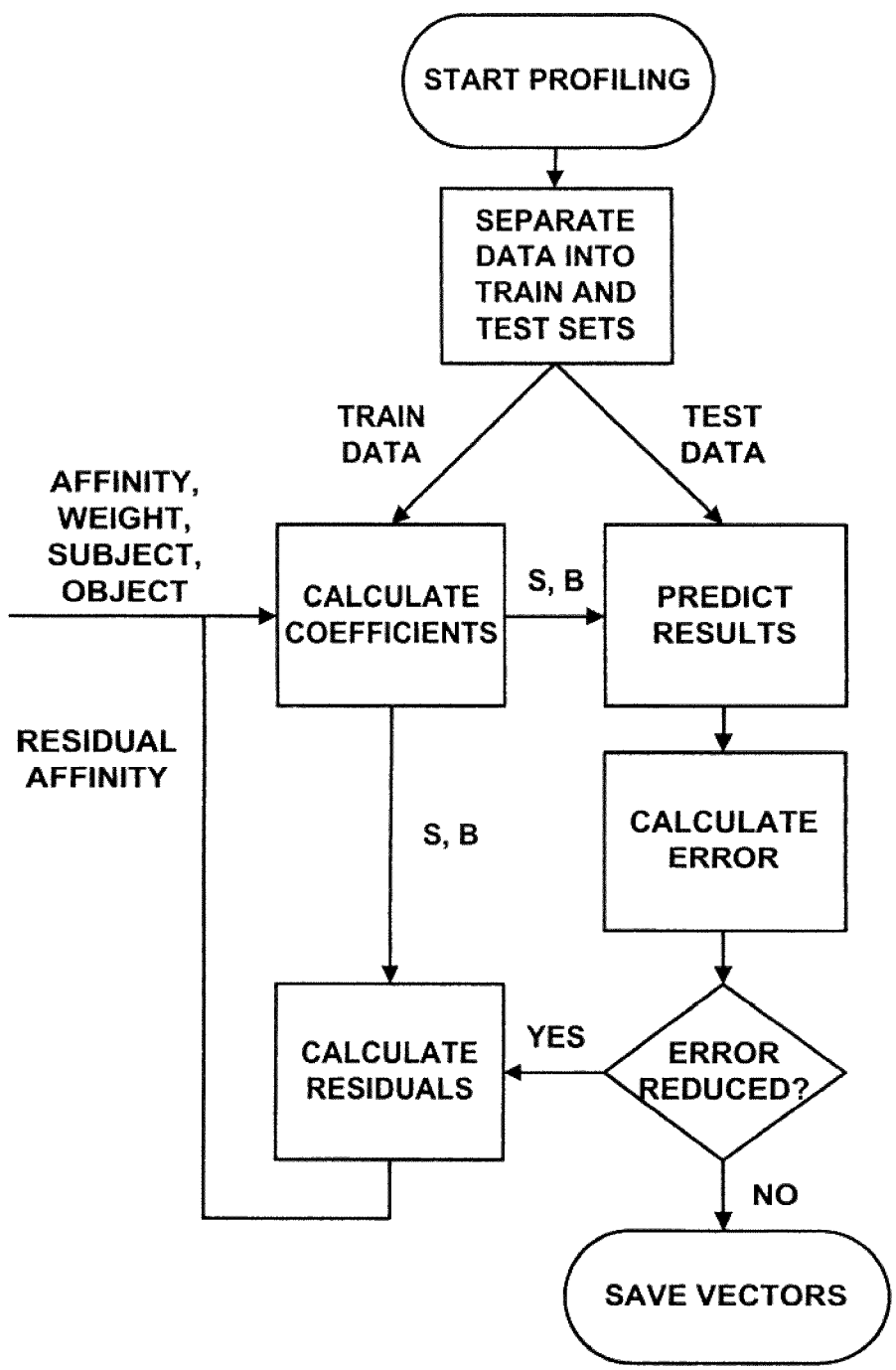
FIG. 8 shows progressive method of deriving subject and object vectors based on affinities.

FIG. 8 shows an alternative progressive method of deriving subject and object vectors based on affinities. As before, the affinity data is split randomly into training data and testing data, whereby the training data is used to calculate the next set of coefficients, and the testing set is used to assess whether the incremental dimension is effective in predicting affinities. Both the training data and the testing data consist of entries of the form {subject i, object j, affinity A, weight w}. The subject and object vectors are calculated dimension by dimension as follows: For the first dimension the training data are used to generate single-dimension subject and object coefficients according to the bootstrap training method described above. The resulting 1-D vectors are then used to generate predicted affinity values for the subject/object combinations in the test set. The predicted affinities are compared to the actual (known) affinities and the error $f_{AE}$ is calculated. Also, the residual affinities [actual−predicted] are calculated. On the second and subsequent passes, the residual affinities are substituted for the affinity values used in the previous iteration. The next set of coefficients are calculated and appended to the previous subject and object vectors. The predicted affinities are re-calculated for the test set and compared to the residual affinities. The resulting error function is compared to the previous iteration. If the error is reduced, then the residuals are fed to the next iteration and the next dimension of coefficients is generated. If the error function is not reduced, the vectors are truncated and saved for live deployment. Note that at each iteration, the vector values need to be initialized with non-zero values. This can be done by setting the values randomly from −1 to +1 or by setting the values to what would reproduce the average affinity across all of the samples for that subject or object.

Unlike other modeling approaches, which determine the model parameters from a set of known input/output relationships, the present invention derives both the inputs and the model parameters from a set of known outputs and a specified transfer function (e.g., dot product between subject vector and object vector). In this sense the subject and object vectors have roles both as input vectors and as model parameters. More specifically, when the subject vector is calculated, the object vectors are treated as inputs to a linear regression model and the subject vector is the set of linear coefficients. However, when the object vector is calculated, the roles are reversed, and the subject vectors are the inputs and the object vector is the set of model coefficients. Although each individual fit can be seen as a linear model involving a small number of parameters, the aggregate process of simultaneously building both subject and object vectors is a nonlinear model with a very large number of parameters.

A key advantage of this approach is that it automatically derives the attributes that describe the subjects and objects, as opposed to requiring an detailed analysis of the domain of the application and expert definition of a set of attributes that may only apply to that domain. For this reason the invention is self-adaptive and self-optimizing to any application, without regard to types of objects, behavior of subjects, language, or culture. A second advantage is that this method automatically determines the optimal number of dimensions to describe the subjects and objects, resulting in maximum predictive effectiveness with the most compact and computationally efficient form. A third advantage is that, unlike models where the inputs are fixed, because the model inputs in this method are self-derived, it is possible to calculate the dimensions sequentially instead of simultaneously. Not only is this more computationally efficient, but because each successive dimension is trained against the residuals of the affinities, the dimensions are naturally ranked and orthogonal, effectively reproducing a principal components factorization of the affinity data. This makes it possible to initiate a profile of an object or particularly a subject prior to obtaining a number of samples equal to or more than the number of dimensions in the model. Instead, the underdetermined subject or object vector can be calculated up to the dimension equal to the number of samples and the subsequent dimensions can be set to zero.

Figure 9:
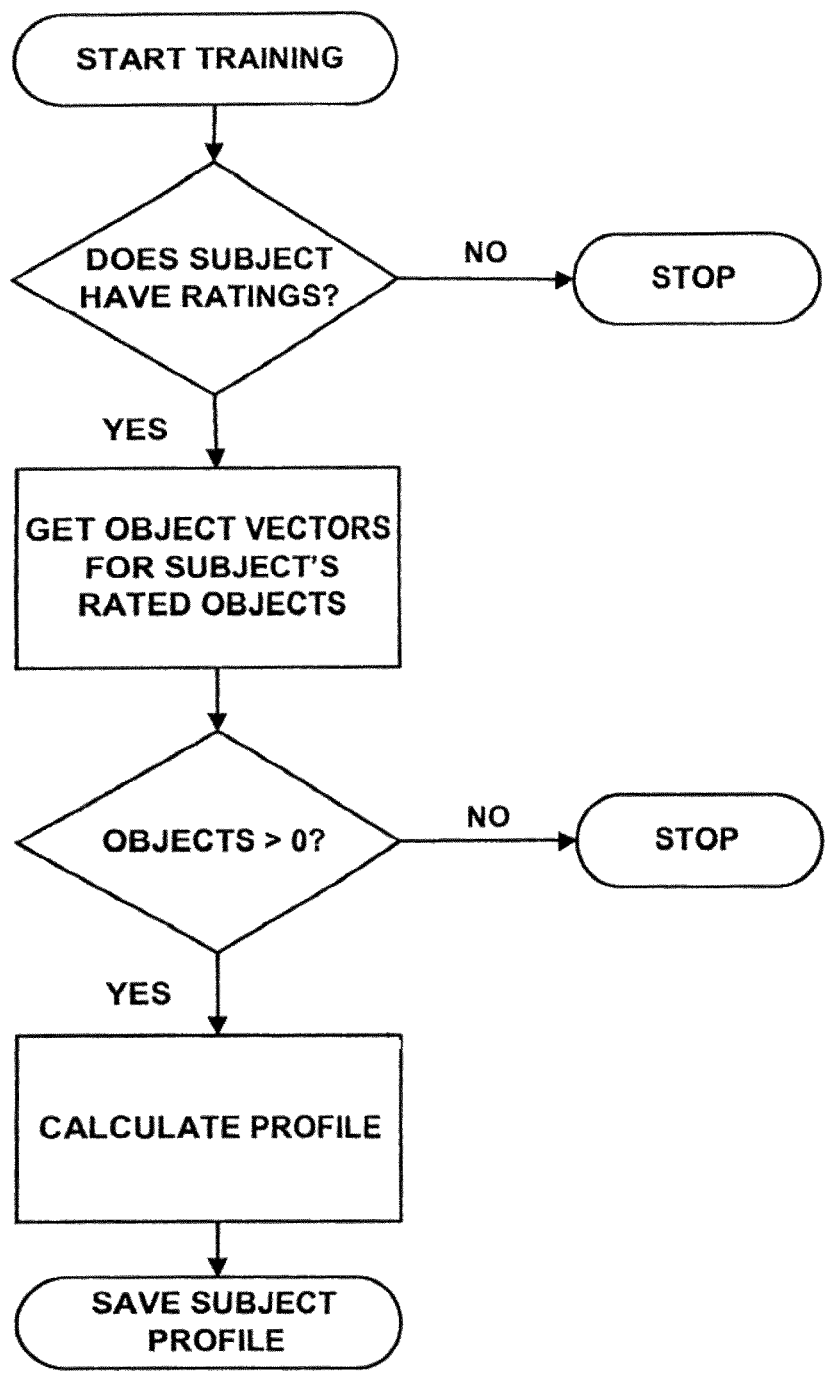
FIG. 9 shows the training update for a single subject vector.

FIG. 9 shows the training update for a single subject vector. This case is invoked to re-train a subject while leaving all object vectors fixed. This case is included as a single step in the incremental general affinity update described above. Note that this method should not be invoked to re-train after the insertion of an affinity unless both the subject and object vectors pre-exist.

The training process is as follows:
  Get the set, {B}, of all objects that have been rated by the subject, S, and for which object vectors exist. Create an object lookup table and a (single) subject lookup table.
  Get the affinities A(S, {B}) for the subject and objects selected above. Use lookup tables for database ID ↔ array index conversions.
  Generate the subject vector, S, of the specified number of dimensions. Training minimizes the error function $f_{AE}$ (S, {B}) with the constraint that only the vector S is varied, while the set {B} is fixed.
  Save the updated subject vector S to the Subject Profiles database.

Figure 10:
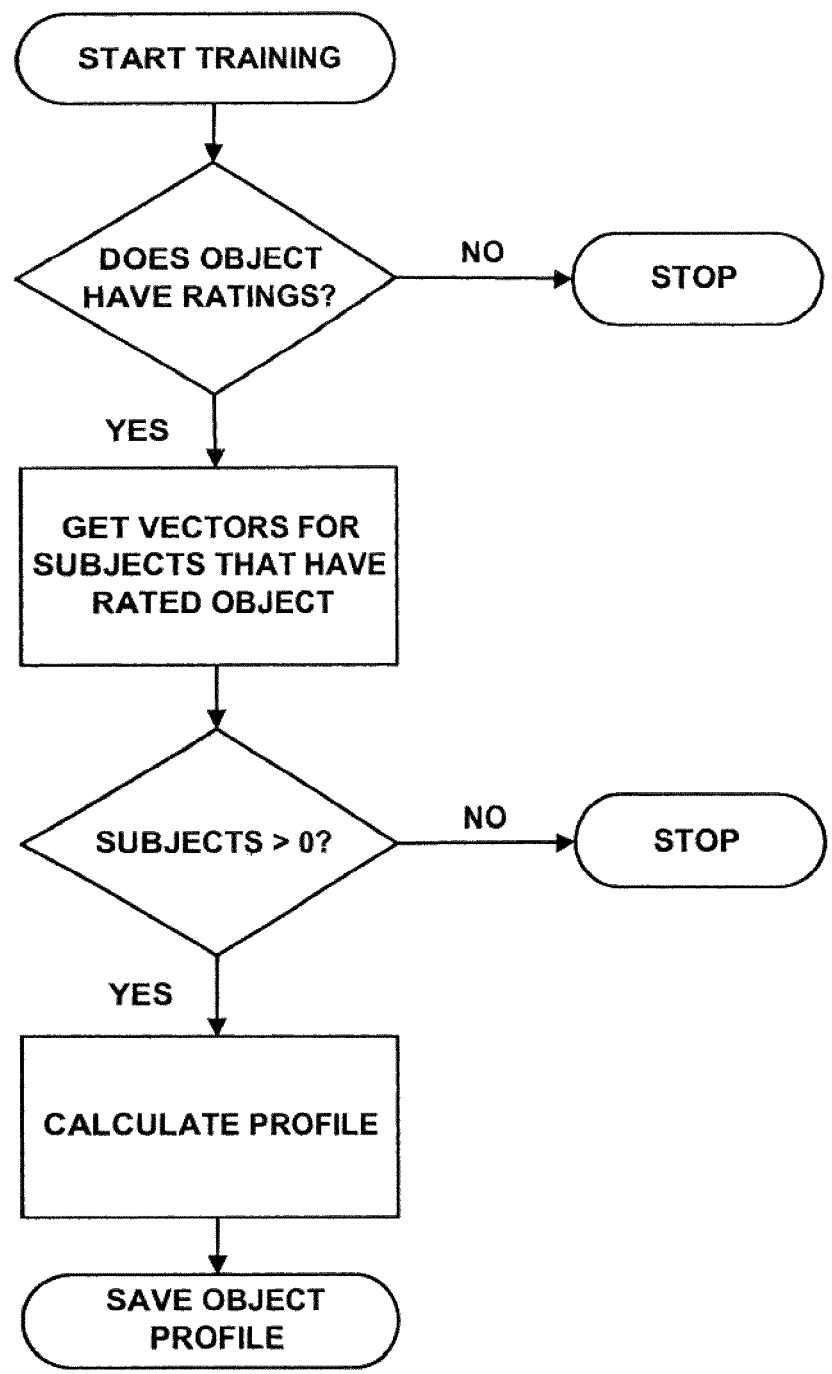
FIG. 10 shows the training update for a single object vector.

FIG. 10 shows the training update for an object vector. This case is invoked to re-train an object while leaving all subject vectors fixed. This case is included as a single step in the incremental general affinity update described above. Note that this method should not be invoked to re-train after the insertion of an affinity unless both the subject and object vectors pre-exist.

The training process is as follows:
  Get the set, {S}, of all subjects that have rated the object, B, and for which subject vectors exist. Create a single object lookup table and a subject lookup table.
  Get the affinities A({S}, B) for the subjects and object selected above. Use lookup tables for database ID ↔ array index conversions.
  Generate the object vector, B, of the specified number of dimensions. Training minimizes the error function $f_{AE}$ ({S}, B) with the constraint that only the vector B is varied, while the set {S} is fixed.
  Save the updated object vector B to the Object_Vectors table.

Figure 11:
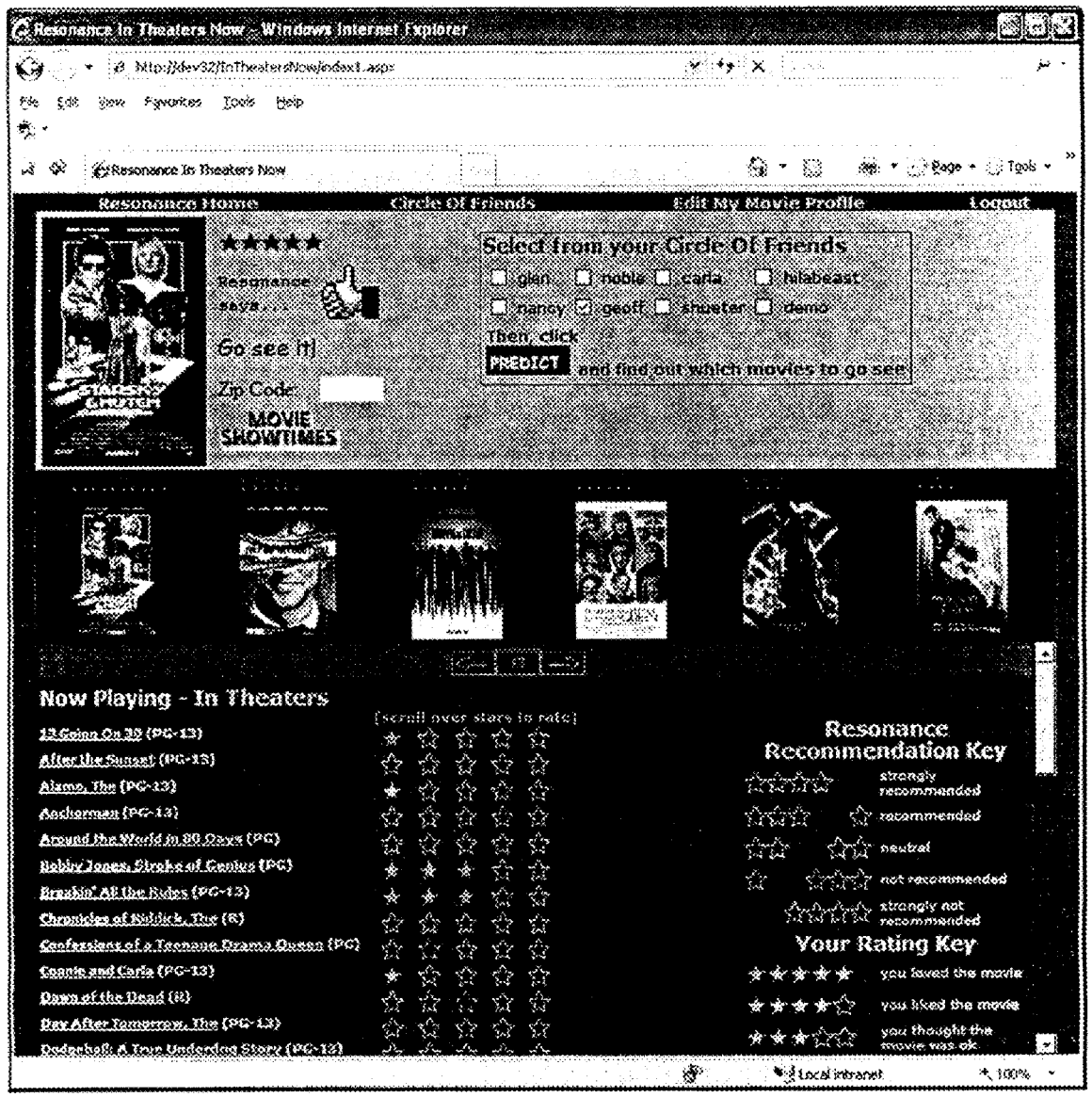
FIG. 11 shows an embodiment of a movie selector.

An embodiment of the invention in a recommendation application is described next. Objects that can be processed with the invention include, but are not limited to, consumer products, music, books, theatre, art, employer/employee matching, and travel. FIG. 11 shows an embodiment of a movie selection application, which works as follows: A new user creates an account and logs into the movie guide application. This could be a website accessible from either a PC or a mobile phone, or it could be an in-store kiosk or other interface. Because preferences have not yet been given by the new user and the system can only build the user's profile by modeling the user's profile against other users, the application defaults to the "Community" list, which presents the movies that the subject has not viewed rank-ordered by the system prediction of greatest user response. As soon as the user rates enough movies (i.e., greater than or equal to the number of dimensions of the profile vector), then the system generates the user's profile and offers customized recommendations to the user. Once a user has been profiled, then the user subsequently enters the site at the recommendation list. This maximizes convenience to the user while driving the user to provide ratings of items that the user has viewed based on previous recommendations.

Users can also browse and rate movies that have not been rated by other users. Similar to the new user, a new movie will be profiled and recommended to users when enough ratings have been entered by profiled users; that is, when the number of ratings is greater than or equal to the number of dimension of the profile vector.

The system could also be used in an employer-employee matching application, such as a job posting website. The website would allow companies (employers) to post jobs, which would then be browsed and responded to by potential employees. At the same time job candidates (employees) would be able to post their resumes, which could then be searched and responded to by potential employers. In this case the roles would depend on the user of the application. When the employee is using the application, then the employee would be the subject and the employer would be the object. When the employer is using the application, then the employer would be the subject and the employee would be the object. Thus, both employers and employees would be profiled as both subjects and objects. Note that there is no requirement for a person's subject and object profiles to match, since their roles are much different. Similarly, when the system is applied to a dating service, a member will be profiled and matched as a subject when searching for potential dates and profiled and matched as an object when targeted by potential dates.

Figure 12:
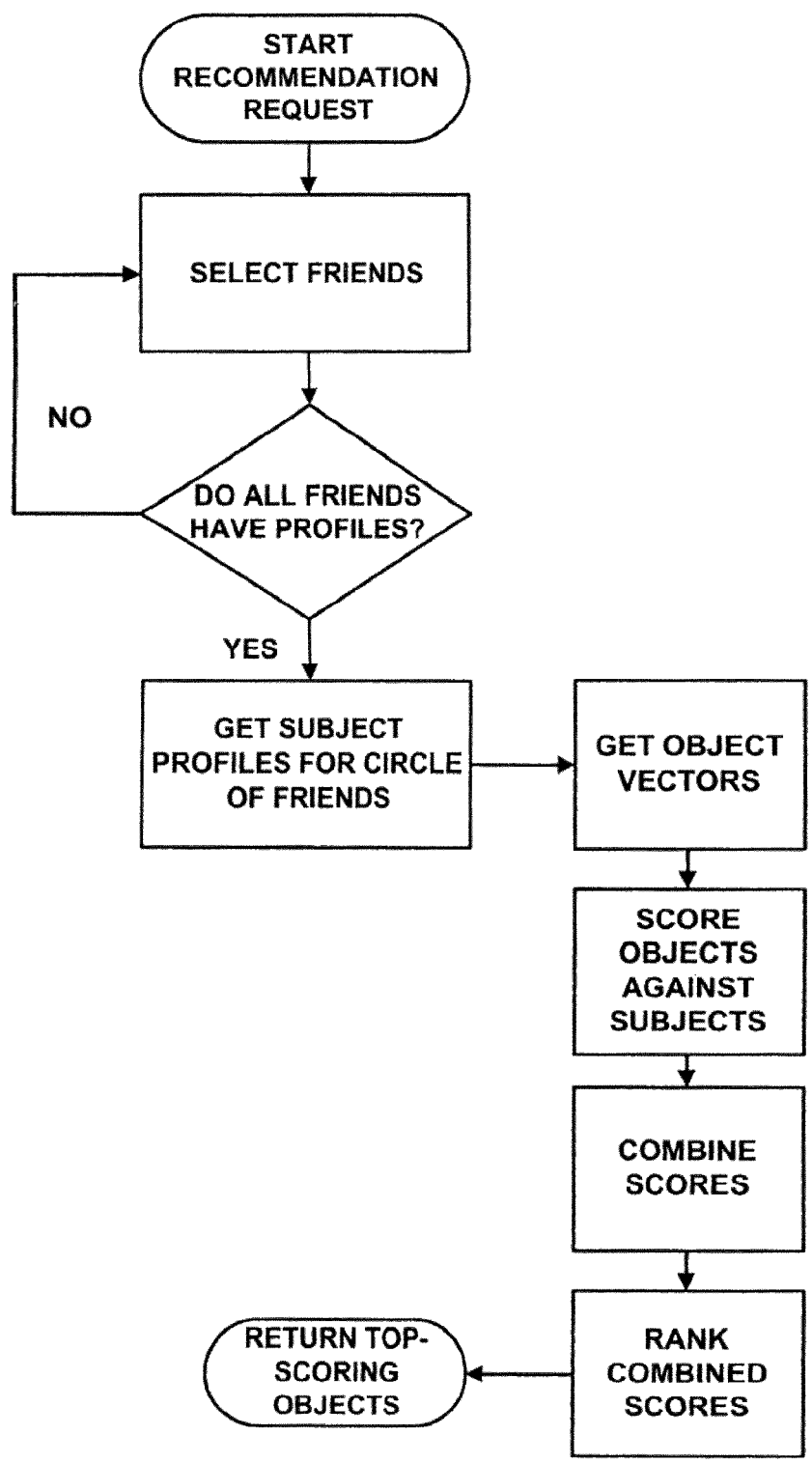
FIG. 12 shows the operation of the system to generate recommendations for a group of users.

In many applications, such as entertainment, food, or travel, the object will be consumed by multiple subjects. In this case it is desirable to determine the best recommendations for a group of people as opposed to a single individual. FIG. 12 shows the detailed data flows and operation of the system to generate recommendations for a group of users. This embodiment is also referred to in this patent by the trademarked name, Circle of Friends™. To start the process, the system first checks the set of subjects to see whether all have profiles. If not, then the system discards the unprofiled subjects or else notifies the user requesting group recorminendations to select a different set of friends. Once the recommendation set has been validated, then the system retrieves the subject vectors for all subjects in the group and matches them against all of the object vectors of consideration. The subjects' matching scores are then combined, and the top ranking objects across the entire group are returned to the application for display or other use. The system combines the list of recommendations for the users in the group according to $$P_{group} = \left( \prod_{i=1}^{M_{Group}} P_i \right)^{1/M_{Group}},$$

where $P_{group}$ is the group recommendation, $P_i$ is the individual recommendation for the $i^{th}$ user and $M_{group}$ is the number of members of the group. Although the more typical approach of using the arithmetic mean to predict average response could also be used, this approach of the geometric mean is more effective because, unlike the arithmetic mean, the geometric mean provides adequate weighting to the lowest scoring individual, whereas the arithmetic mean may ignore the lowest scoring individual if there are overriding high scores from other individuals. By suggesting items for which it predicts high satisfaction for the entire group rather than for just a single subject, the system provides additional functionality to single subject applications. For example, in an office or automobile environment, a custom, broadband radio station could optimize its play list for the subjects present. In a movie guide application, the affinity group could be used as a "Date Night" feature, whereby the guide would suggest the best movie for two or more selected subjects. A third example would be a gift registry, which would users could register subjects and groups of subjects that could be used to filter gift suggestions, including restricting suggestions to objects that are compatible with both the giver and the receiver. Note also that this group recommendation process can be applied to any recommendation system that generates recommendations as a ranked list of recommendation, or match, scores, which includes the methods described in this patent and potentially other recommendation methods.

Figure 13:
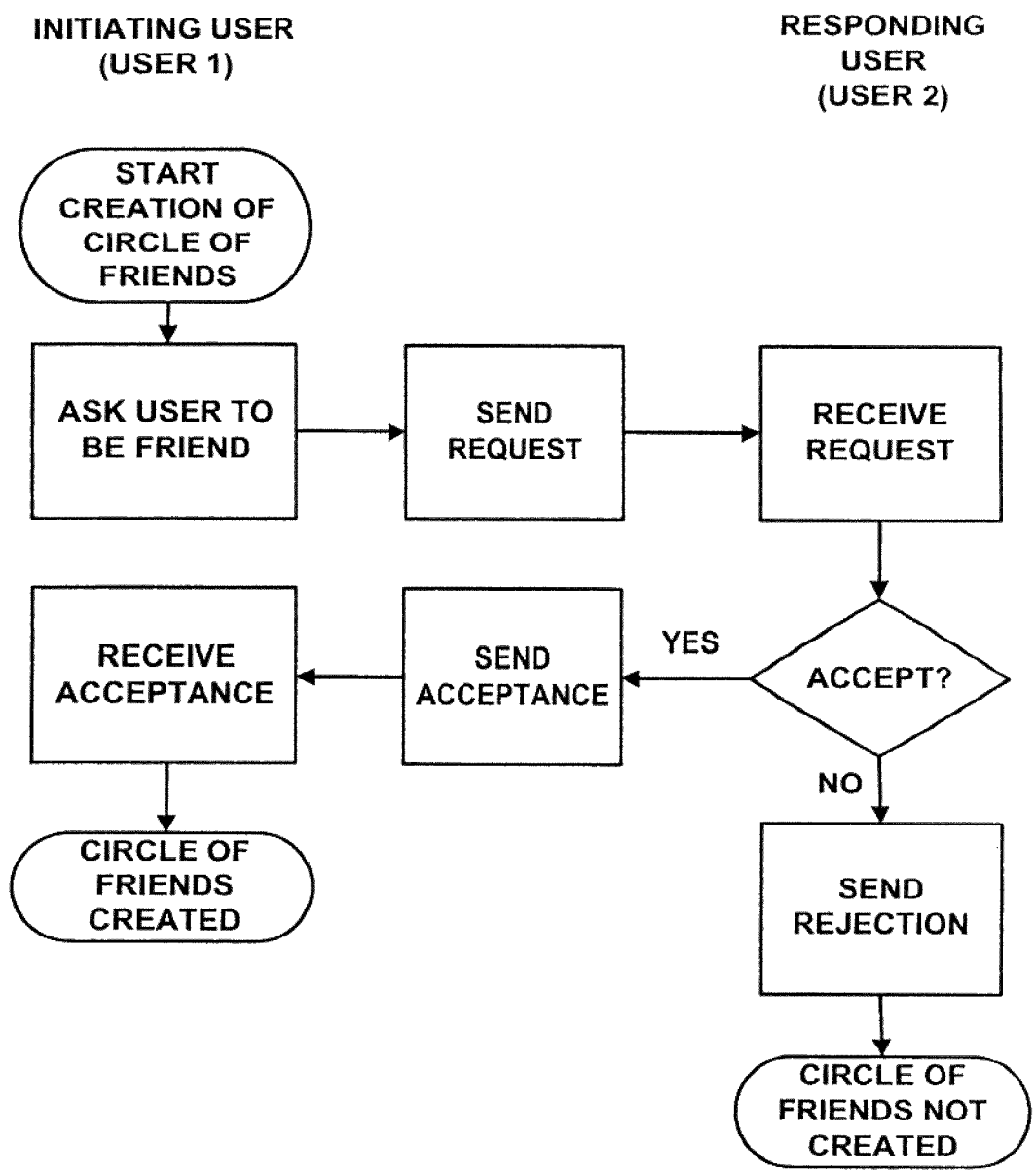
FIG. 13 shows the operation of the system to create an associated group of subjects (Circle of Friends™).

FIG. 13 shows the detailed data flows and operation of the system to create an associated group of subjects. In order to provide privacy and control to the members of the group, the creation of a group is a double opt-in process, as follows: The first user initiates a request to the second user, either by the user name that the second user is known to the application, or by e-mail or other identifier of the second user. The system generates a request and notifies the second user that the first user would like to be friends. The second user can then either accept the request and the second user is added to the first user's circle of friends, or the second user declines the request, in which case no association is made. At a later time, either user can opt out of the association.

Figure 14:
FIG. 14 shows an embodiment of a group recommendation system.

FIG. 14 shows an embodiment of group recommendation system. This is an extension of the movie selection application described in FIG. 11. In this case the user selects which friends to include in the recommendations. Once the selections are made, the user then clicks the "predict" option, which submits the group selections to the system. The system then generates recommendations using the method described above and displays the recommendations to the user. As the user changes the selection of friends, the system changes the recommendations that best match that particular group. Another embodiment of group recommendations would be the generation of video or audio playlists for a group of people. Another embodiment would be a gift registration, whereby the gifter can combine his interest with those of the recipient.

Figure 15:
FIG. 15 shows an embodiment of an online retailer.

FIG. 15 shows an embodiment of an online retailer. In this case the system collects information about the website visitor's interests based on the musical artists, genres, song samples, reviews, and other aspects of the site that are viewed by the visitor. With each action that the visitor takes, the system updates the visitor's profile and returns products and content targeted to that profile. The system can recommend specific songs, albums, or genres that match the visitor's profile according to the context of the browsing experience.

Figure 16:
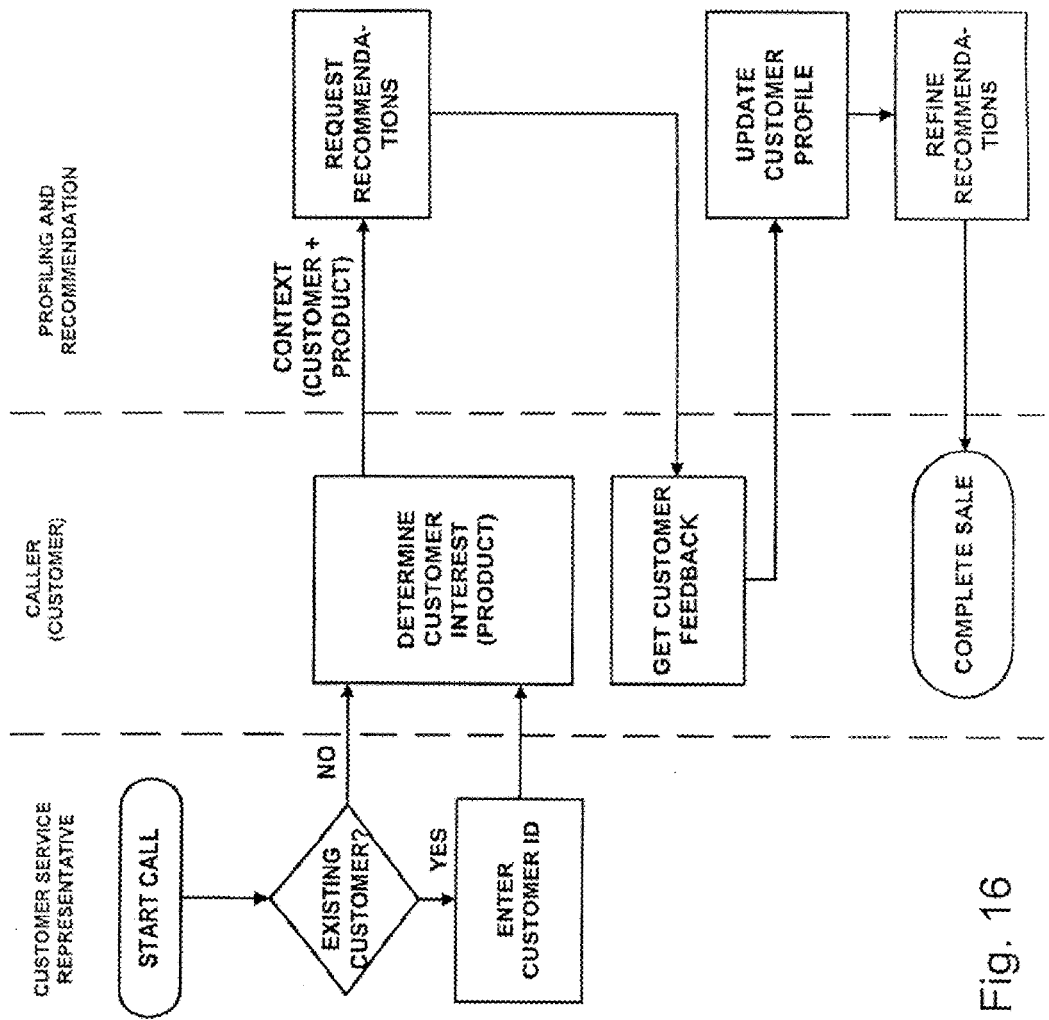
FIG. 16 shows an embodiment of call center integration.

FIG. 16 shows an embodiment of call center integration. This application is similar to an online store or kiosk application, except that the customer service representative acts as a surrogate for the caller in terms of entering data into the system. The call starts with the customer service representative first determining whether or not the caller is a new customer. This can be done by looking up a name, customer ID, order ID, e-mail address, or other unique identifier that is associated with the caller when a purchase or other registration is made. If the customer is already in the system, then the information on the call is added to previous customer information to update the caller's profile and get recommendations. Within the context of the current call, the customer service representative determines the caller's immediate interest, such as a specific product or type of product to purchase. This context is combined with the caller's personal profile to get recommendations that either augment a product that the caller has requested or provide better alternatives to the requested product. As the caller responds to the customer service representative's suggestions, the responses are entered into the system, the caller's profile is updated, and the customer service representative receives updated recommendations to offer to the caller. The profiling process is driven by the positive and negative responses of the caller analogous to a conversion funnel model. In this case higher affinities and weights are given to caller responses that indicate an interest in the recommendations, with the highest affinity and weighting being given to those products that are actually purchased, a lower affinity and weight to recommended products that generate follow-up questions but are not purchased, and a low (negative) affinity to those product recommendations that are rejected out of hand by the caller.

Figure 17:
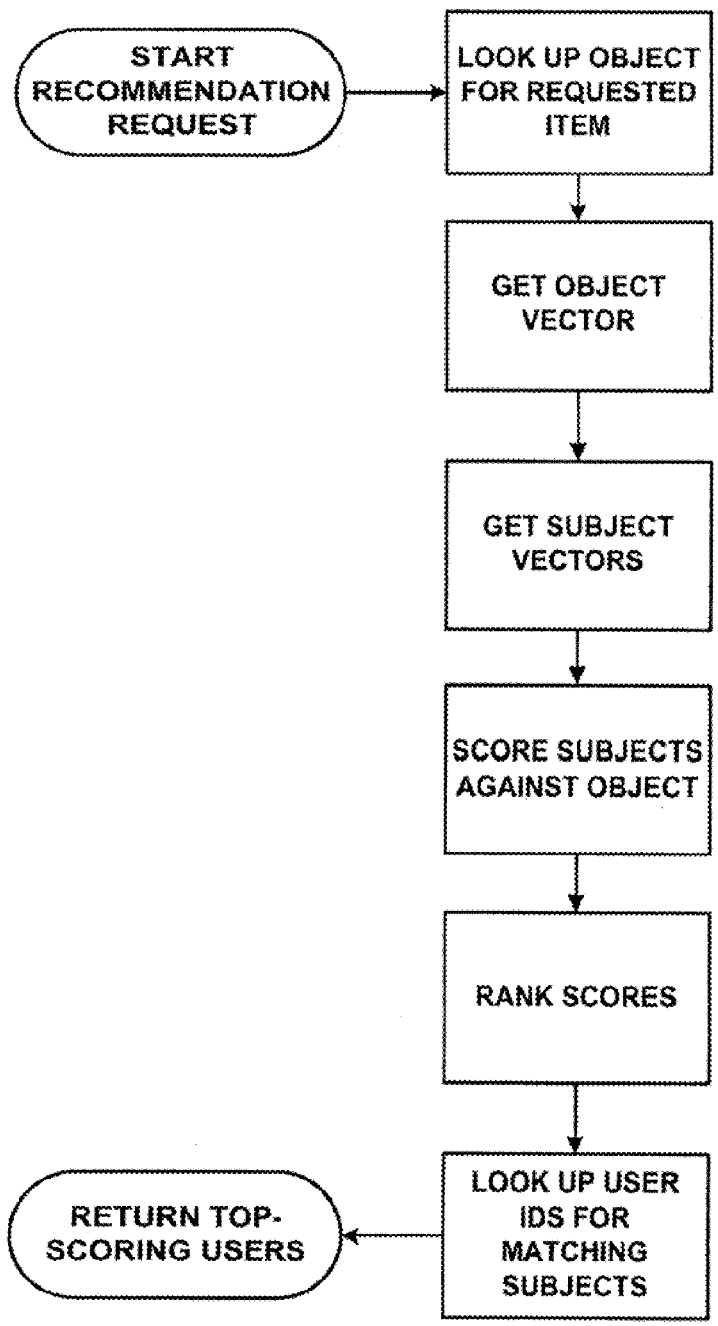
FIG. 17 shows the operation of the system to generate best matching subjects for a single product.

FIG. 17 shows the operation of the system to generate best matching subjects for a single object. This is a specific feature of the invention because the profiling of subject and objects is symmetric and subjects can be matched to objects in the same way that objects are matched to subjects. In this case the system first retrieves the object vector for the item of interest. This typically involves using an item/object lookup table to relate an item in the application catalog with the object identifier used internally by the system, as shown in FIG. 2. The object vector is matched to all of the subject vectors and the highest matching subject vectors are returned in rank order up to the number requested by the application. It may be necessary to translate the matching subject identifiers into user identifiers that are recognizable by the application. This is done using a user/subject lookup table as shown in FIG. 2. An example application that might use this capability to match subjects to objects is in the generation of promotional e-mails to a targeted set of users.

Figure 18:
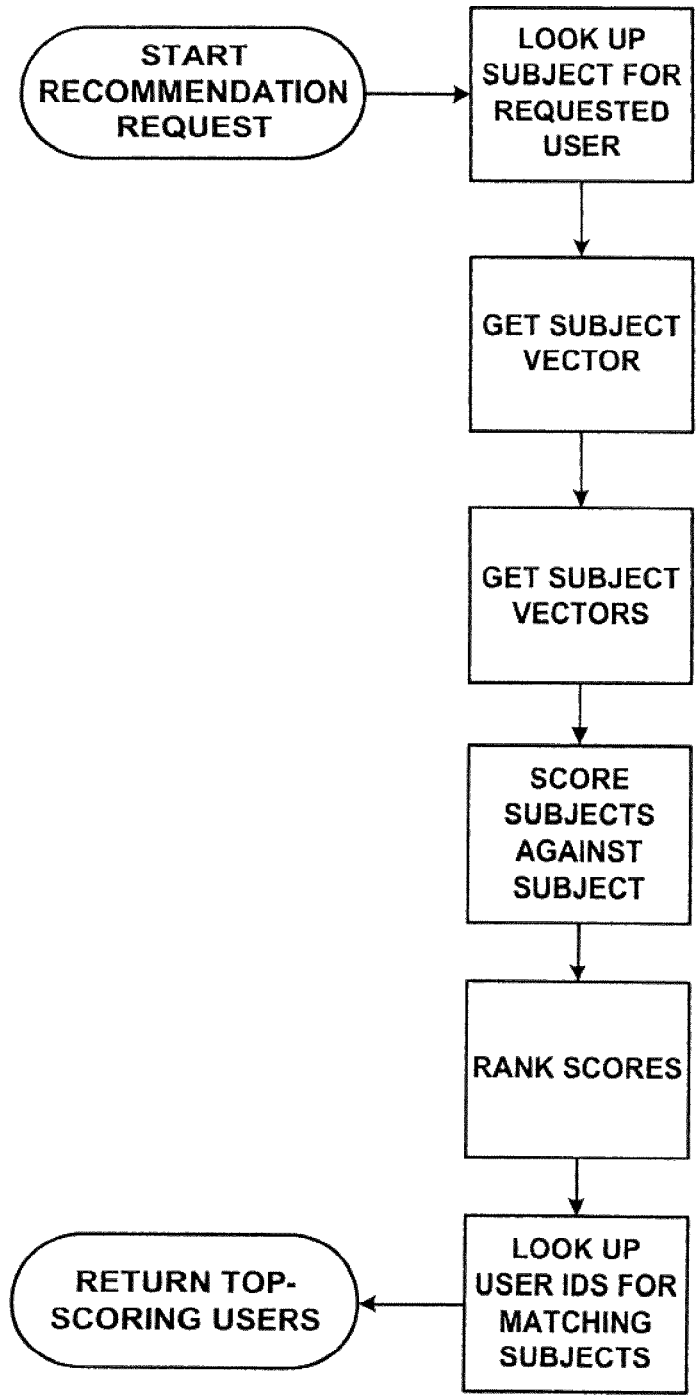
FIG. 18 shows the detailed data flows and operation of the system to match subjects to other subjects.

FIG. 18 shows the detailed data flows and operation of the system to match subjects to other subjects. This capability of the invention derives from the feature that two subjects are similar if they have reacted similarly to similar objects. Thus, two subjects are similar if their subject vectors are similar. To get matching subjects for a requested subject, the system first retrieves the subject vector for the subject of interest. This typically involves using a user/subject lookup table to relate a user in the application database with the subject identifier used internally by the system, as shown in FIG. 2. The subject vector is matched to all of the other subject vectors and the highest matching subject vectors are returned in rank order up to the number requested by the application. It may be necessary to translate the matching subject identifiers into user identifiers that are recognizable by the application. Again, this is done using a user/subject lookup table as shown in FIG. 2. Example applications that might use this capability to match subjects to other subjects are finding friends on a social networking website; determining the proper reviews to show a user on an online retail, movie, music, or other content website based on matching the reader/user profile to the profiles of review writers; and matching community generated playlists to like-minded users on a music website.

Figure 19:
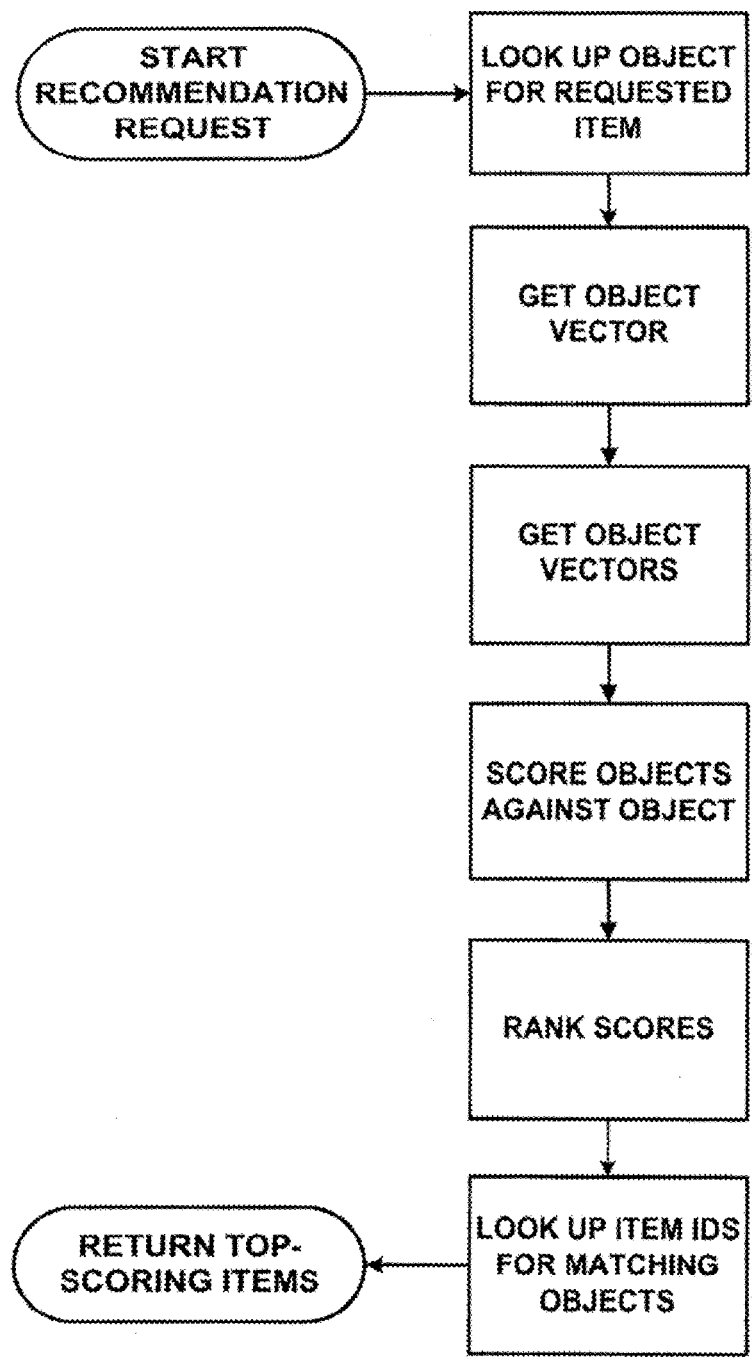
FIG. 19 shows the detailed data flows and operation of the system to find objects that are similar to other objects.

FIG. 19 shows the detailed data flows and operation of the system to find objects that are similar to other objects. This capability of the invention derives from the feature that two objects are similar if similar subjects react to them similarly. Thus, two objects are similar if their object vectors are similar. To get matching objects for a requested object, the system first retrieves the object vector for the object of interest. This typically involves using an item/object lookup table to relate an item in the application database with the object identifier used internally by the system, as shown in FIG. 2. The object vector is matched to all of the object vectors and the highest matching object vectors are returned in rank order up to the number requested by the application. It may be necessary to translate the matching object identifiers into item identifiers that are recognizable by the application. Again, this is done using an item/object lookup table as shown in FIG. 2. Example applications that might use this capability to match objects to other objects are matching search terms to content items; finding products to upsell on an online retail website; and finding related articles on a media website.

Figure 20:
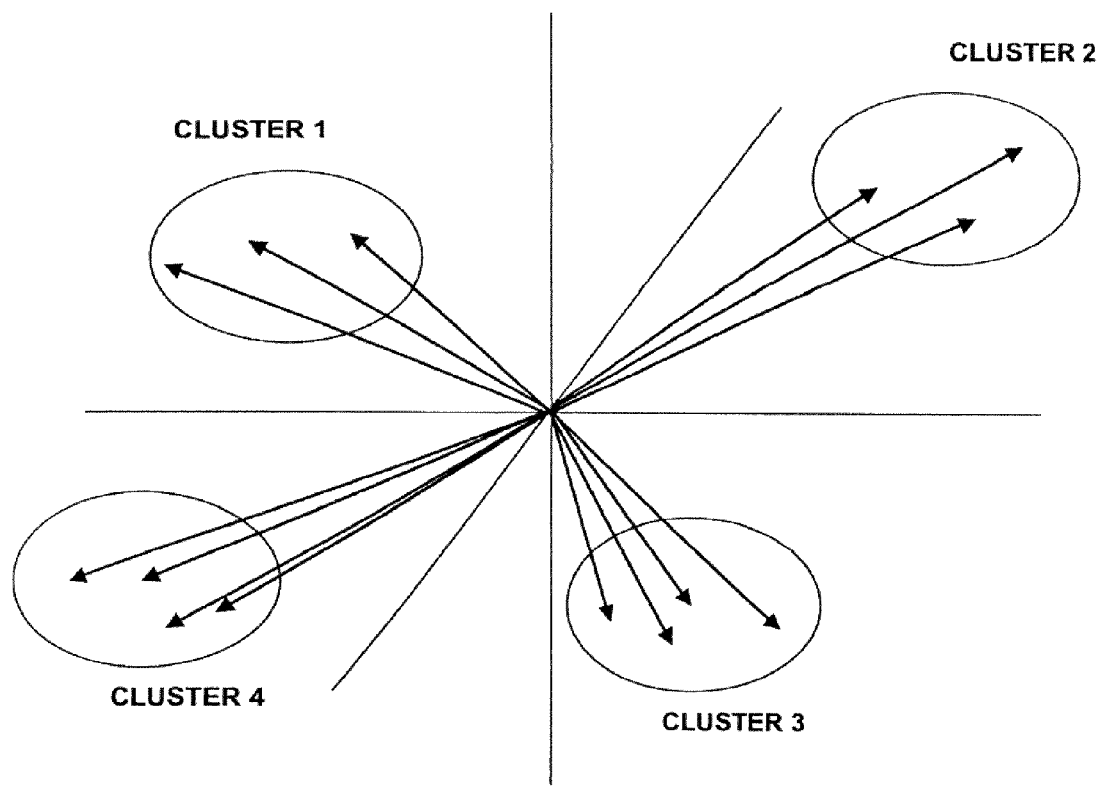
FIG. 20 shows how profile vectors can be clustered for organizing the presentation or categorization of objects or subjects.

FIG. 20 shows how profile vectors are clustered for organizing the presentation or categorization of objects or subjects. Uses of such clusters include music playlists for a personalized streaming radio; video channels for (hard to classify) user-generated content; affinity groups for social networking; or hierarchical browsing of a catalog or other content. Because two objects are similar if their object vectors are similar, groups of similar objects can be created based on minimizing a distance metric within each group. Different types of distance metrics can be applied, but the most common is minimum Euclidean distance. An alternative metric would be minimum projection (i.e., dot product of normalized vectors). Various methods exist for clustering a set of vectors into a specified number of clusters, including K-means, self-organizing feature maps, or other methods. Common groups of subjects are created using the same vector clustering methods.

Figure 21:
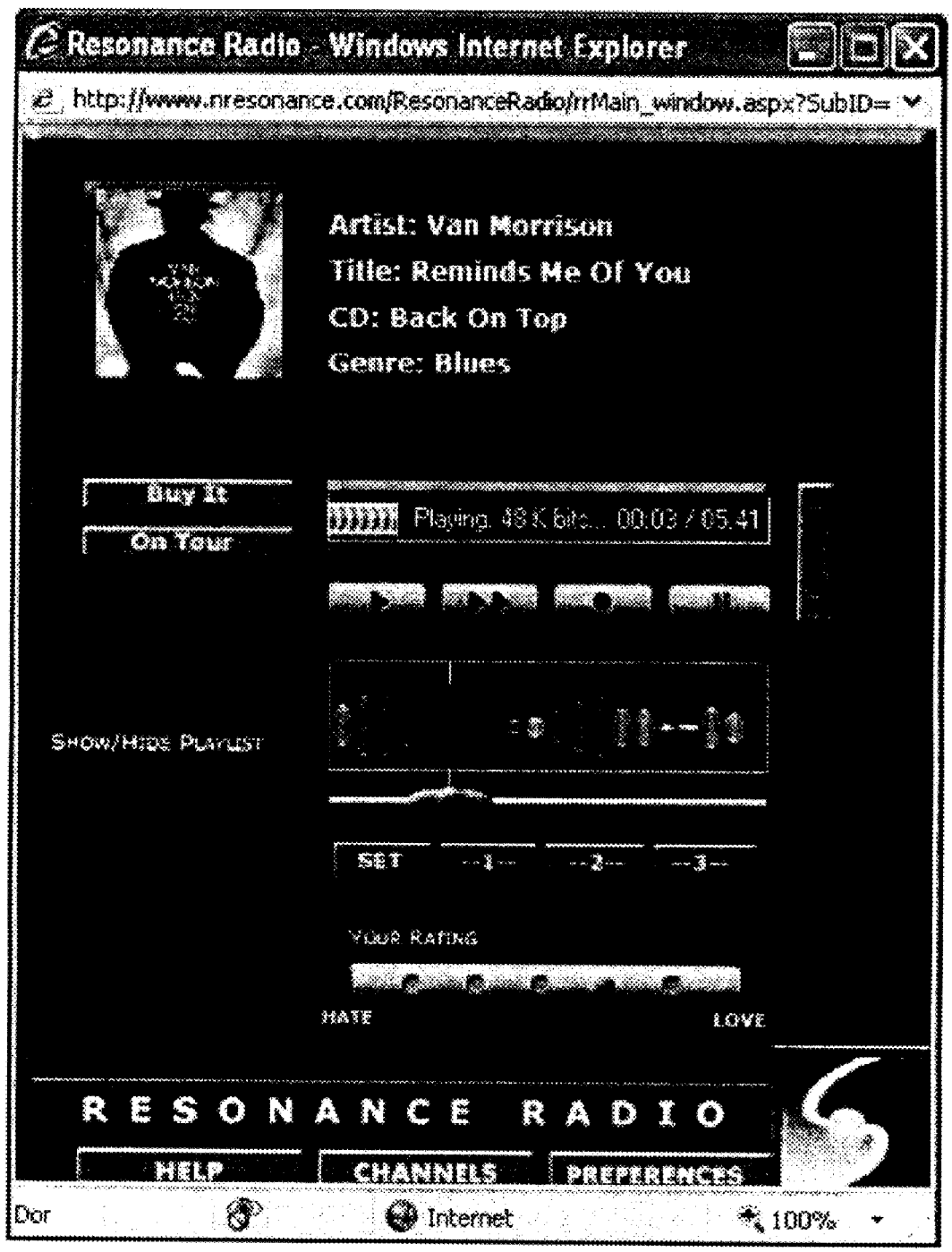
FIG. 21 shows an embodiment of a personalized online music player.

FIG. 21 shows an embodiment of a personalized online music player. In this case the system is used to generate of a personalized playlist for a personal music device, such as a MP3 player or an automotive music player. The music player uses the profiles in two ways: First, it creates channels, or playlists, by clustering the object vectors of the songs into a preset number of channels. The listener (subject) can then select these channels for listening as in the case of a conventional radio. Second, within each channel the songs selected for play would be personalized to the listener, or group of listeners in the case of a Circle of Friends, by matching the object vectors in the channel cluster to the specific subject vector of the listener(s). The personalized player works as follows: The music downloading application receives a list of songs for the subject from the recommendation engine. The application then downloads musical selections according to the playlist. As the subject listens to the music on the player, the subject can either provide ratings directly through a rating function on the faceplate of the player, or the subject can provide ratings indirectly by means of changing channels, skipping the song or adjusting the volume. For example, if a user listens to only a brief amount of the song or changes channels, then it can be inferred that the listener has a low affinity for the song, whereas if the listener listens to all or most of the song, then it can be inferred that the listener has a high affinity for the song. Similarly, if the listener turns up the volume, that action implies a higher affinity for the song, while turning down the volume implies a lower affinity. Note that to drive music discovery, the interface can have different coding schemes to indicate the character of the channel and predicted match to the listener's interests. For example for the interface shown in the figure, two channels that are similar in color will have similar content. Also, the channels with the larger dimensions (taller ovals) indicate those channels that the system predicts have more music that matches the listener's tastes.

More specifically, based on interaction with the player, the user's affinity to a song is modified as shown in the table below. Affinities range from 0 to 1.

| Current Song Termination | Current Rated? | Affinity Update (g = % listened) | Explanation |
| --- | --- | --- | --- |
| <any> | Y | User rating | user rating overrides all other actions |
| skip before 7 seconds | N | None | not interested |
| skip after 7 seconds | N | g | heard enough |
| change channel | N | g | not interested or heard enough |
| song completed | N | 1.0 (g = 100%) | |
| volume up/volume down | N | ignore | |
| Replay | N | additive g (up to 100%) | |
| Pause | N | Boost | indicates additional interest |
| Close | N | None | not interested |
| preferences | N | None | not interested |

Inference of similarity relies on comparing the amount to which the user listens to a song relative to the extent expected from the predicted affinity. That is, consecutive songs are similar to the extent that they're both listened to as expected.

| Previous Song Termination | Current Song Termination | Current Rated? | Similarity Update f = min((listened/ expected), 1) | Explanation |
|---|---|---|---|---|
| skip before 7 seconds skip after 7 seconds song completed | skip before 7 seconds skip after 7 seconds song completed | N/A | 3 · f1 · f2 − f1 − f2 | |
| Start | | | none | reset, nothing to compare to |
| preferences | | | none | reset, nothing to compare to |
| change channel | | | none | reset, nothing to compare to |
| | close | | none | Abort |
| | preferences | | none | abort |
| | change channel | | none | abort |

The expected listening fraction is the user rating if the user has rated the song (implicitly or explicitly), including the case of the rating having just occurred; the predicted affinity if there is a predicted affinity; and the amount listened to if the song is novel (f=1). An exception is that if the song is skipped before 7 seconds, then f=0, regardless of expectation.

The inference of similarity can be improved by selection of the reference song, f1. The use of adjacent songs, independent of the amount listened, suffers from two significant drawbacks during the bootstrapping process: First, the relative rarity of two similar songs falling consecutively means that more interactions are negative; i.e., if the user is selecting for a specific mood, then most of the songs will be skipped, resulting in most feedback being of mild dissimilarity. Second, as the user skips two consecutive songs that the user might of otherwise have considered similar in a different mood, the system would consider these orthogonal, although opposite. To better capture the mood, a better approach is to establish a "mood reference". This is a song that the user has listened to a reasonable amount, either as a percentage of the song listened or a percentage of the expected amount. Given that a song is played in the proper mood when it is fully listened to, then use of the actual percentage is desirable, although the threshold to accept a song as a reference should not be too high (e.g., 50%). This results in the following method:

The mood reference is reset at the start of a session.
A song becomes a mood reference if the user listens to more than a fraction r of the song. (For example, r=50%.)
Once a reference has been established (f1), then the similarity of each subsequent song (f2) to the mood reference will be estimated using the above formulas. If the song satisfies (2), then it replaces the mood reference.
Each channel has its own mood reference.

The following parameters determine the playlist:
T=novelty interval (integer). A novel song is inserted every T songs. A novel song is one that has not been rated by any user. If a completely novel song is not available, then a song can be selected that is at least novel to the user.
P=candidate song pool for playlist generation. Must be at least R+L
R=minimum interval between successive plays of a song.
L=desired playlist length. If affinity threshold is set too high, it may not be possible to provide the requested number of songs.
A=minimum affinity acceptance. Only includes songs with G≥A, where −1≤A≤1.
B=selection bias towards songs with higher affinities. Songs are selected randomly weighted by G^B.
C=channel vector
O=object similarity vector
G=greater affinity=rating if user has rated the song or predicted affinity if user has not rated the song but user has subject vector. If subject does not have a subject vector, then use community rating for G.

According to the settings of the above parameters, the playlist is generated as:
SELECT TOP P songs
WHERE G>=A
ORDER BY ||C-O||
where ||C-O|| is the dot product norm between the channel vector C and the object similarity vector O. For each member of P, assign a sort parameter S=rand( )*(1+G)^B, and then select the songs as:
SELECT *
FROM P
ORDER BY S The playlist is created from above ordered set, inserting novel song every T songs (if novel songs available). If insertion of a song violates repeat interval R, then do not include the song. Stop at L or at the last song if P did not return enough songs (due to too high of an acceptance threshold).
The user's channel affinity is predicted as:
SELECT max(||C-O||), ave(G) FROM TOP L songs
WHERE G>=A
ORDER BY ||C-O||

Figure 22:
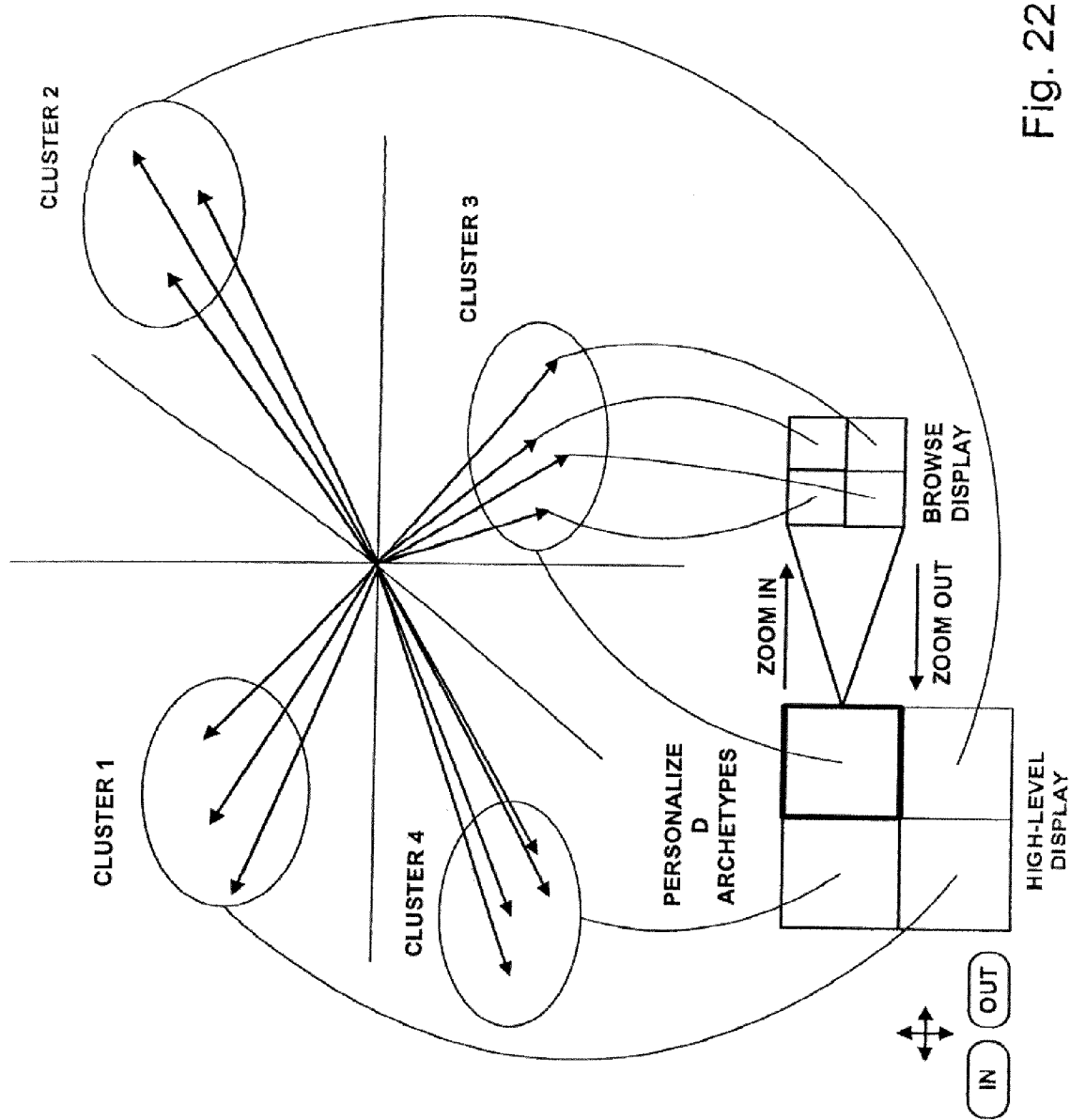
FIG. 22 shows how the profile vectors clusters can be used to browse a content hierarchy.

FIG. 22 shows how the profile vector clusters can be used to browse a content hierarchy. This might be used, for example, in an embodiment of a personalized shopping assistant. The browsing mechanism works as follows: First, all of the object vectors in the catalog or content set are grouped into a specified number of clusters. This might be on the order of 10 to 25 clusters depending on the variety of different types of goods or content that are covered by the catalog. Next, the subject vector of the browsing user is matched against the objects in each content cluster to determine the highest matching object for each cluster. These highest matching objects are then used as archetypes for the clusters and the cluster hierarchy is presented to the user with the archetypes representing each cluster. This is done in a visual way, with images or summaries of the archetypes, and with possible color-coding to indicate level of match with the user. As the user selects a particular group for browsing, the system then takes the collection of objects within that group, applies a sub-clustering into the same or otherwise appropriate number of categories, calculates the archetypes for the sub-clusters and then presents the new categories and archetypes. The user can continue to drill down into the catalog, zoom out to a higher hierarchy level, or move across clusters within a hierarchy level. This application can be used to drive product or content discovery of any catalog, but is particularly effective to facilitate the organization and browsing of objects for which there is not a known taxonomy (set of classification attributes) or that are not easily categorized, such as user-generated content on social networking sites. Particularly at higher levels of the hierarchy, where the clusters cover a broader range of items, it may be desirable to show the user the widest variety of items within the selected cluster. This can be done by maximizing the dispersion, or variance about the cluster center, of the presented items. This can be done, for example, by first selecting the object closest to the cluster center and then selecting each subject object based on furthest average distance from the preceding objects. This "dis-similarity" method can also be applied to present the widest range of items within any set of objects, such as those within a catalog category, brand, genre, or other classification of items.

Figure 23:
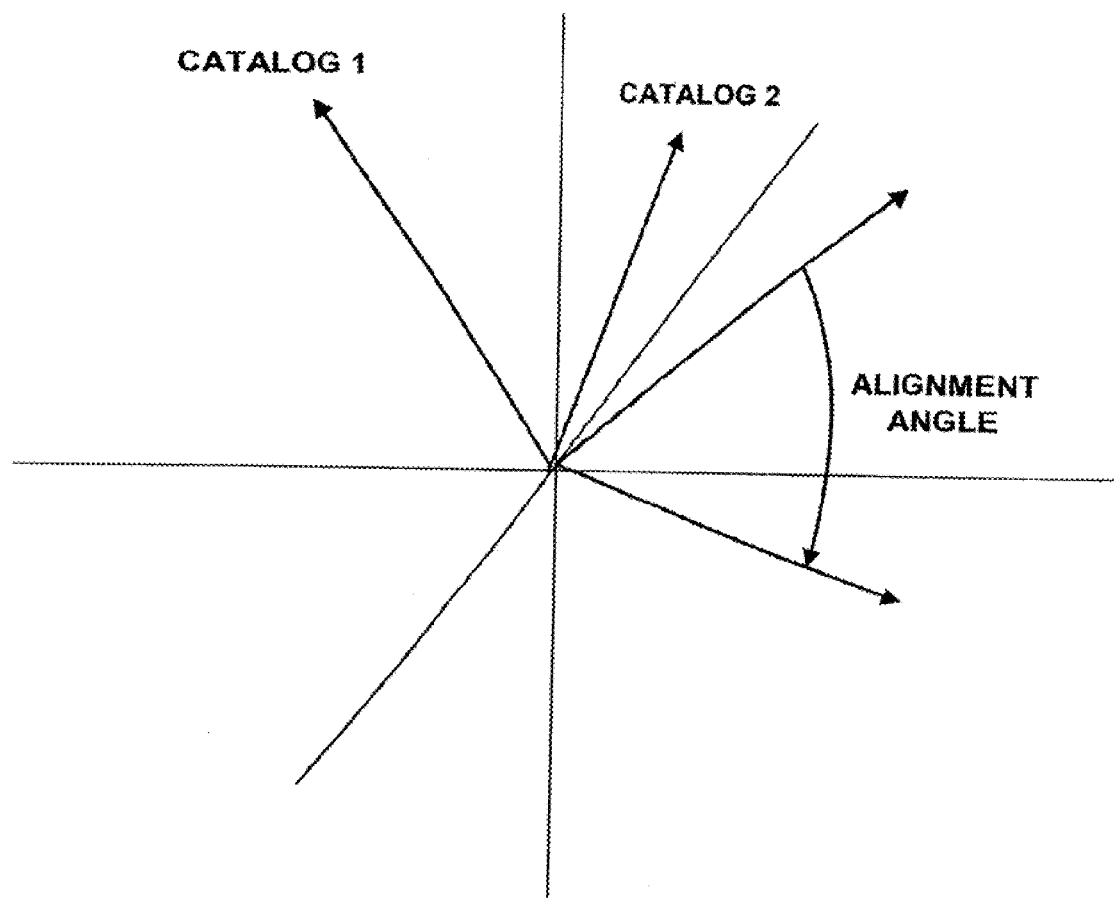
FIG. 23 shows a method of aligning attribute spaces to make predictions across application instances.

FIG. 23 shows a method of aligning attribute spaces to make predictions across application instances for cross-marketing purposes. This method relies on some set of either subjects or objects that can be used as a set of behaviorally stationary fiducials between the two spaces. This process would be applied to cross reference one Resonance database with another or to minimize the vector changes before and after a complete re-training of a single Resonance database. The training procedure is as follows:

Get all subject and object vectors {V} common to both affinity spaces and create lookup tables. If there are no common vectors between the spaces, then use the principal axis vectors of the distributions of the subject and object vectors.

Calculate the rotation between spaces that minimizes the differences between the common vectors. The measure of difference will be the same measure that is used to determine matches of subjects and objects within a single space. This is usually the dot product, but alternatively could be Euclidean distance or some other vector distance metric.

Rotate all of the vectors in one space by above rotation. Note that this is a multi-dimensional rotation.

Measure success by the sum of the errors between the common vectors in each space.

The above application embodiments are for example only. The invention does not restrict the design and implementation of the application in any way, as long as the interface to the recommendation engine matches the protocols defined by the interface guidelines. A key aspect of the invention is that, unlike other methods, it does not in fact require knowledge of the application and does not need to parse the application's content, other than to align the application's subjects and objects with the internal catalog in the case that the application holder desires to aggregate data with other applications.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A computer-based service system comprising:
a database that contains affinity data of a plurality of users;
a computer server configured to generate a subject affinity vector representation of a subject and an object affinity vector representation of an object, and to produce an object recommendation for delivery to an external application, the produced object recommendation based on the subject affinity vector, the object affinity vector, and the affinity data;
wherein the subject affinity vector and the object affinity vector each have a respective number of dimensions; and
wherein the predicted affinity of the subject to the object is calculated by matching the subject affinity vector to the object affinity vector; and wherein the computer server is further configured to generate the subject affinity vector and the object affinity vector by producing initial subject affinity vectors and initial object affinity vectors having respective initial dimensions, to determine predicted affinity values based on the initial subject affinity vectors, initial object affinity vectors, and a subset of the affinity data, and to calculate a cost function; and wherein the computer server iteratively increases the dimensions of the generated subject affinity and object affinity vectors, and recalculates the cost function based on the differences between the predicted affinity values and actual affinity values, until the cost function reaches a predetermined value, and wherein the actual affinity values are based on user input.

2. The service system according to claim 1, wherein the user input is received from explicit user rating values.

3. The service system according to claim 1, wherein the user input is determined from analysis of user behavior.

4. The service system according to claim 1, wherein the database includes ratings that are produced from collected user behavior that is any of implicit behavior or explicit behavior, or both.

5. The service system according to claim 1, wherein the subject affinity vector and object affinity vector are based on data of respective subjects and objects profiled at different times and matched across time.

6. The service system according to claim 1, wherein the subject affinity vector and object affinity vector are based on data of respective subjects and objects that are clustered together in vector space, and further wherein said clusters are aligned across separate application vector spaces.

7. The service system according to claim 6, wherein the recommendations are dispersed across a targeted cluster.

8. The service system according to claim 1, wherein the number of dimensions and values of each dimension of the subject affinity vector are derived independently of and do not correspond to pre-identified attributes of the subject or specific object ratings of the subject and further wherein the number of dimensions and values of each dimension of the object affinity vector are derived independently of and do not correspond to pre-identified attributes of the object.

9. The service system according to claim 8, wherein the subject affinity vector and object affinity vector are determined from data comprising object ratings produced by the subjects, and wherein the subject affinity vectors and object affinity vectors are calculated through a number of iterations, with each iteration consisting of first calculating the subject affinity vector as the parameters of a linear regression model with the object similarity vectors as the inputs to the model and the corresponding actual affinity values as the target model outputs and then calculating the object affinity vectors as the parameters of a linear regression model with the subject similarity vectors as the inputs to the model and the corresponding actual affinity as the target model outputs, and further wherein the vector updates are iterated until either the cost function of differences between the predicted and actual affinity values or the successive decreases in such cost function are below predetermined thresholds.

10. The service system according to claim 1, wherein the external application includes any one of a web page, a personalized radio, a personal computer system, an in-store kiosk, a personal digital assistant (PDA), a mobile phone, a set top box, or a conventional telephone.

11. The service system according to claim 1, wherein the recommendation includes recommendations to a self-associated group that are calculated by combining the predicted affinities for each object across the subjects of the self-associated group.

12. The service system according to claim 1, wherein the iterative change to the generated subject vector S produced by the computer server from a time t to a time t+1 is defined, by $$S_i(t+1) = S_i(t) - \alpha \frac{\partial f_{AE}}{\partial S_i(t)}$$

where $S_n$ is the generated subject vector for a subject n at time t, $f_{AE}$ is an error function, and $\alpha$ is a gradient function.

13. The service system according to claim 1, wherein the iterative change to the generated object vector B produced by the computer server from a time t to a time t+1 is defined by $$B_j(t+1) = B_j(t) - \alpha \frac{\partial f_{AE}}{\partial B_j(t)}$$

where $B_n$ is the generated object vector for an object n at time t, $f_{AE}$ is an error function, and $\alpha$ is a gradient function.

14. The service system according to claim 1, wherein the matching the subject affinity vector to the object affinity vector consists of calculating the dot product between the subject affinity vector and the object affinity vector.

15. The service system according to claim 1, wherein combining the predicted affinities for each object across the objects of the self-associated group includes combining the predicted affinities as the geometric mean of the predicted affinities for an object across the subjects of the self-associated groups.

16. A computer-implemented method of producing an object recommendation to an external application, the method comprising;
    generating, at a server computer, a subject affinity vector representation of a subject and an object affinity vector representation of an object;
    producing an object recommendation for delivery from the server computer to an external application, the object recommendation based on the subject affinity vector, the object affinity vector, and affinity data of a database of a plurality of users;
    wherein the subject affinity vector and the object affinity vector each have a respective number of dimensions, the predicted affinity of the subject to the object is calculated by matching the subject affinity vector to the object affinity vector, and the computer server is further configured to generate the subject affinity vector and the object affinity vector by producing initial subject affinity vectors and initial object affinity vectors having respective initial dimensions, determining predicted affinity values based on the initial subject affinity vectors, initial object affinity vectors, and a subset of the affinity data, and calculating a cost function, and wherein the computer server iteratively increases the dimensions of the generated subject affinity and object affinity vectors, and calculates the cost function based on the differences between predicted affinity values and actual affinity values, until the cost function reaches a predetermined value, wherein the actual affinity values are based on user input.

17. The method according to claim 16, wherein the user input is received from explicit user rating values.

18. The method according to claim 16, wherein the user input is determined from analysis of user behavior.

19. The method according to claim 16, wherein the database includes ratings that are produced from collected user behavior that is any of implicit behavior or explicit behavior, or both.

20. The method according to claim 16, wherein the subject affinity vector and object affinity vector are based on data of respective subjects and objects profiled at different times and matched across time.

21. The method according to claim 16, wherein the subject affinity vector and object affinity vector are based on data of respective subjects and objects that are clustered together in vector space, and further wherein said clusters are aligned across separate application vector spaces.

22. The method according to claim 21, wherein the recommendations are dispersed across a targeted cluster.

23. The method according to claim 16, wherein the number of dimensions and values of each dimension of the subject affinity vector are derived independently of and do not correspond to pre-identified attributes of the subject or specific object ratings of the subject and further wherein the number of dimensions and values of each dimension of the object affinity vector are derived independently of and do not correspond to pre-identified attributes of the object.

24. The method according to claim 23, wherein the subject affinity vector and object affinity vector are determined from data comprising object ratings produced by the subjects, and wherein the subject affinity vectors and object affinity vectors are calculated through a number of iterations, with each iteration consisting of first calculating the subject affinity vector as the parameters of a linear regression model with the object similarity vectors as the inputs to the model and the corresponding actual affinity values as the target model outputs and then calculating the object affinity vectors as the parameters of a linear regression model with the subject similarity vectors as the inputs to the model and the corresponding actual affinity values as the target model outputs, and further wherein the vector updates are iterated until either the cost function of differences between the predicted and actual affinity values or the successive decreases in such cost function are below predetermined thresholds.

25. The method according to claim 16, wherein the external application includes any one of a web page, a personalized radio, a personal computer system, an in-store kiosk, a personal digital assistant (PDA), a mobile phone, a set top box, or a conventional telephone.

26. The method according to claim 16, wherein the recommendation includes recommendations to a self-associated group that are calculated by combining the predicted affinities for each object across the subjects of the self-associated group.

27. The service system according to claim 16, wherein the matching the subject affinity vector to the object affinity vector consists of calculating the dot product between the subject affinity vector and the object affinity vector.

28. The service system according to claim 26, wherein combining the predicted affinities for each object across the objects of the self-associated group includes combining the predicted affinities as the geometric mean of the predicted affinities for an object across the subjects of the self-associated groups.

29. A computer-based service system comprising:
    a database that contains affinity data of a plurality of users;
    a computer server configured to generate a subject affinity vector representation of a subject and an object affinity vector representation of an object, and to produce an object recommendation for delivery to an external application, the object recommendation based on the subject affinity vector, the object affinity vector, and the affinity data;

wherein the subject affinity vector and the object affinity vector each have a respective number of dimensions, the predicted affinity of the subject to the object is calculated by matching the subject affinity vector to the object affinity vector, and the computer server is further configured to generate an initial subject affinity vector having an initial number of dimensions and to generate an initial object affinity vector having the initial number of dimensions, based on a subset of the affinity data, and is further configured to modify the initial subject affinity vector and initial object affinity vector with at least one additional dimension and produce predicted affinity values based on the modified initial subject affinity vector and modified initial object affinity vector, and to determine a cost function for the modified initial subject affinity vector and modified initial object affinity vector, based on the predicted affinity values; and wherein the computer server is further configured to iteratively add additional dimensions to the generated subject affinity vectors and to the generated object affinity vectors to produce modified subject affinity vectors and a modified object affinity vectors and new predicted affinity values, and to determine a new cost function for the modified subject affinity vectors and the modified object affinity vectors, based on the new predicted affinity values, such that the computer server halts the modifying and uses the last modified subject affinity vector and last modified object affinity vectors as the subject affinity vector and the object affinity vector for the object recommendations, in response to a value of the cost function being equal to or less than a predetermined value of the cost function.

* * * * *